US005524535A

United States Patent [19]

Strutz et al.

[11] Patent Number: 5,524,535

[45] Date of Patent: Jun. 11, 1996

[54] METHOD AND APPARATUS FOR HIGH SPEED DECORATION OF BOTTLES

[75] Inventors: Carl J. Strutz, Mars; John M. Zwigart, New Brighton; Gary W. McCoy, Evans City; Mark R. Tweedy, Valencia, all of Pa.

[73] Assignee: Carl Strutz & Co., Inc., Mars, Pa.

[21] Appl. No.: 208,964

[22] Filed: Mar. 9, 1994

[51] Int. Cl.[6] .............................. B41F 15/30; B25J 11/00

[52] U.S. Cl. .......................... 101/38.1; 101/40.1; 101/41; 101/44; 101/124; 414/744.3; 414/744.4; 414/763; 414/772; 414/773; 414/779

[58] Field of Search .............................. 101/35, 38.1, 39, 101/40, 41, 40.1, 44, 123, 124, 126, 129; 414/744.3, 744.4, 744.5, 761, 763, 772, 773, 776, 779; 198/457, 476.1, 478.1

[56] References Cited

U.S. PATENT DOCUMENTS

| | | | |
|---|---|---|---|
| 2,231,535 | 2/1941 | Jackson et al. | 101/115 |
| 2,261,255 | 11/1941 | Jackson | 101/124 |
| 2,721,516 | 10/1955 | Campbell et al. | 101/40.1 |
| 3,146,705 | 9/1964 | Ritzerfeld et al. | 101/144 |
| 3,172,357 | 3/1965 | Rudolph et al. | 101/126 |
| 3,251,298 | 5/1966 | Rudolph et al. | 101/40 |
| 3,315,779 | 4/1967 | Karlyn | 101/38.1 |
| 3,338,574 | 8/1967 | Rudolph et al. | 269/86 |
| 3,503,329 | 3/1970 | Rossi | 101/123 |
| 3,648,821 | 3/1972 | Rudolph et al. | 198/378 |
| 3,907,124 | 9/1975 | Legg | 414/779 |
| 4,176,598 | 12/1979 | Dubuit | 101/40.1 |
| 5,207,156 | 5/1993 | Helling | 101/38.1 |
| 5,291,984 | 3/1994 | Lusetti | 414/776 |

*Primary Examiner*—Stephen Funk
*Attorney, Agent, or Firm*—Clifford A. Poff

[57] ABSTRACT

Bottles are decorated while advanced by intermittent motion to each of a plurality of decorating stations where a squeegee presses a decorating screen into line contact with a surface of the bottle which has a speed the same as the speed of which the decorating screen is advanced along the printing station. The bottles are decorated at a higher through put rate by initiating linear movement of the screen before the bottle arrives at the decorating station and continuing linear movement of the screen after the bottle moves from the decorating station. The degree of overlap allows the printing cycle to consume a major part of a machine cycle while the bottle indexing cycle consumes a minor part of the machine cycle. The bottles are received in a vertical orientation and intermittently re-orientated horizontally for entrance to the decorating machine. The intermittent handling and reorientation of each bottle is carried out by drive systems by using closed cams to always maintain control of the workpiece position during the handling of operations. After decoration, the bottles are intermittently received with a horizontal orientation by delivery equipment. The delivery equipment intermittently orientates the bottles to a vertical orientation and then transfers the bottles in an intermittent fashion to a delivery conveyor.

25 Claims, 20 Drawing Sheets

TIMING FOR CS-150 DECORATOR

METHOD AND APPARATUS FOR HIGH SPEED DECORATION OF BOTTLES

BACKGROUND OF THE INVENTION

1. Field of the Invention

The present invention relates to improvements to an intermittent motion type decorating machine for increasing the number of workpieces decorated per unit of time over that known in the art, and, more particularly, to improvements to a method and apparatus for decorating workpieces passed into and from one or more decorating stations at a greater rate per unit of time without impairing the intermittent decorating operation by a decorating screen as well as improvements to workpiece supply and delivery systems situated upstream and downstream of the workpiece flow through the decorating stations.

2. Description of the Prior Art

As shown in U.S. Pat. Nos. 2,231,535; 2,261,255; 2,721,516; and 3,146,705 intermittent motion type decorating machines are known in the art and provide a drive system to impart intermittent traveling motion to the workpieces such as containers made of glass or plastic. A container is moved through a predetermined distance, stopped, moved again through a predetermined distance, stopped and again moved until each container through the sequence of motions moves completely through the decorating stations of the machine. A decorating station will be provided at one or more places where the container comes to a stop. At the decorating station, a decorating screen is displaced into line contact with the surface of the container by an associated squeegee. During the decorating process, a synchronous speed relation is maintained at a line of contact established by the squeegee between the screen undergoing linear displacement and the container undergoing rotation°. The squeegee remains stationary during the decorating process°. Decorating machines of this type are particularly useful to decorate bottles and carryout the decoration process while the surface of the bottle to be decorated is horizontally orientated. In the aforesaid U.S. Pat. No. 2,261,255 there is disclosed moving a body screen and a shoulder screen at substantially the same peripheral linear speed as the body and shoulder portions of the bottle during the decorating operation. It was heretofore, as disclosed in the aforesaid patent number 3,251,298, believed that intermittent motions of decoration machines have limited production rates and can decorate 125 bottles per minute. It was believed in rare instances wherein exact timing is achieved, a production rate of 150 bottles per minute could be attained. The teaching in the art, at that time, was to decorate bottles at a bottle decorating rate of 150 bottles per minute by continuous decoration because of the limitation placed on intermittent type decorating machines.

In U.S. Pat. No. 3,388,574, there is shown a workpiece carrier device for supporting a bottle in a horizontal orientation while intermittently moved along a path of travel through a decorating apparatus. The bottle is supported at its opposite ends by clamping chucks one of which has a journal extending from a bearing support and the other of which can move to releasably contact a bottle for causing rotation about a horizontal axis. The bottle is rotated by a drive member brought into a driving relation with the protruding journal part of the bearing support. The clamping chucks are operatively supported on a base which is secured to chain-links forming an endless conveyor chain extending along the path of travel of bottles through the decorating apparatus.

Intermittent motion type bottle decorators are known in the art to provide, according to one construction of machine parts, a bottle decorating rate on the order of 100 to 125 bottles per minute. The decoration is carried out by establishing a decorating cycle essentially made up of two equal parts. One half of the decorating cycle is used for the decoration and the remaining half of the cycle is used for indexing movement of the bottle through the decorating machine. There was no overlap between the decorating and indexing cycles. During the first part of the decorating cycle, the screen is moved synchronous with the peripheral speed of the rotating bottle to avoid smearing during decoration at the line contact established by a squeegee with the bottle. When the screen moves to the end of its travel, the bottle has rotated 360° whereupon the screen drive mechanism maintains the screen stationary for the remaining part of the decorating cycle while the bottle is moved from the decorating station and an undecorated bottle is positioned at the decorating station. The decorating cycle is then repeated. Robustly constructed drive mechanisms are necessary to withstand the forces of inertia and impact loading which occur due to the intermittent motion of the bottles to and from the decorating station, the rotation of the bottle for the decorating process and the drive mechanism for reciprocating the decorating screen back and forth at the decorating station.

The present invention provides an increase to the rate at which the bottles are decorated in an intermittent motion type decorating machine by improving not only the method and apparatus by which the bottles are decorated but also the equipment necessary to supply and deliver bottles from the decorating machine. As to the decoration of bottles it has been discovered that merely increasing the drive input speed of the machine will impose erratic behavior to the critical speed matching relation of the screen and bottle during decoration and wreck the machine parts because of force overloads. Moreover, the bottles must be handled with greater constraints as they are manipulated during the feeding operation from a source of supply and discharged from the decorating conveyor. The glass forming operations also impose dimensional variations to the bottles that must be accommodated during high speed handling by the bottle entry and delivery equipment as well as during the actual bottle decorating process.

The present invention seeks to provide a workpiece transferring apparatus to transfer workpieces individually from a supply conveyor to a decorating transfer conveyor and thence from a decorating transfer conveyor to a delivery conveyor in which the transfer operations are carried out simultaneously with an orientation of the workpiece. The change to the workpiece orientation, such when the workpiece comprises bottles, has been carried out in the past as shown in U.S. Pat. No. 3,648,821 in which a conveyor supplies the bottles in a vertical orientation to a point where they are transferred by a transfer device to a conveyor forming part of a decorating machine through an orientation from the vertical to the horizontal. The bottles are decorated while horizontally orientated and thence delivered from the decorating machine by a transfer device to a discharge conveyor. The transfer device orientates the bottles from the horizontal to the vertical for conveyance by the discharge conveyor. When the rate at which bottles are fed through the decorating machine increases, there also occurs the need to captively hold the bottle throughout each supply operation through the feed conveyor to the conveyor of the decorating machine and through the conveyor of the decorating machine to the delivery conveyor. Also, the motions necessary to grip and release the workpiece during these transferring operations must be executed with great precision to insure successful handling of the workpiece that necessarily requires that the workpiece be taken from the freestanding stable attitude, re-orientated and placed in a wholly confined driven conveyor and taken from the driven conveyor, re-orientated to again regain a free-standing stable attitude.

SUMMARY OF THE INVENTION

It is an object of the present invention to provide an improved machine cycle for decorating workpieces particularly bottles at a greater through put rate in an intermittent motion type decorating machine than heretofore attainable with such a decorating machine.

It is a further object of the present invention to provide an apparatus to handle workpieces for either or both of the supply and unloading of workpieces from a decorating machine wherein the apparatus is constructed for high speed advancing movement and translating motions between a supply conveyor where the workpieces are vertically orientated and decorating conveyor where the workpieces are horizontally oriented for decoration as well as at the delivery end of the decorating conveyor where the workpiece undergoes translating motion from the horizontal orientation to the vertical orientation and transferred to a discharge conveyor.

More particularly according to the present invention there is provided a method for high speed decorating of workpieces advanced to and from a decorating station, the method including the steps of displacing a decorating screen along a path of travel between a squeegee and a first workpiece while the workpiece is positioned at a decorating station to rotate about an axis lying in a first plane containing the squeegee, removing the first workpiece from the first plane before stopping the advancing movement of the decorating screen to thereby increase the rate for decorating workpieces at said decorating station, advancing the decorating screen relative to the first plane along the path of travel, and positioning and rotating a second workpiece in the first plane after initiating advancement of the decorating screen along a path of travel between a squeegee and the second workpiece, the step of removing the first workpiece before stopping the advancing movement of the decorating screen and the step of positioning and rotating the second workpiece after initiating advancing movement of the decorating screen occurring simultaneously for a period of time to increase the rate at which workpieces are decorated per unit of time.

The present invention also provides apparatus for high speed decoration of workpieces, the apparatus including the combination of a first drive means for intermittently advancing first and second spaced apart workpieces along a course of travel containing a decorating station wherein each workpiece remains stationary during decoration of a workpiece surface, a second drive means for rotating each of the first and second workpieces indexed in succession at the decorating station, the second drive means including control means for initiating rotation of a workpiece before a workpiece is indexed to a fixed position at the decorating station, said control means further continuing rotation of a workpiece after initiating advancing movement of a workpiece from the decorating station, third drive means coupled to a decorating screen for reciprocating a decorating screen relative to a workpiece at the fixed position at the decorating station as well as during the initiating rotation and the continuing rotation of a workpiece, and a fourth drive means coupled to a squeegee for pressing the decorating screen into line contact with a workpiece for decoration thereof.

According to a further object of the present invention there is provided an apparatus for supplying workpieces for a high speed intermittent motion decoration, the apparatus including the combination of means for advancing workpieces in a free standing vertical orientation at a spaced apart relation along a course of travel incident to decoration thereof, stabilizing means captively engaged at vertically spaced apart sites with each workpiece for transferring the workpieces in succession between the means for advancing and a hand off station, transfer means for workpieces at the hand off station of the stabilizing means for intermittently translating the orientation of the workpieces between a first and a second orientation one orientation being vertical and the other orientation being horizontal, and decorating means for intermittently decorating workpieces at the horizontal orientation.

The aforesaid stabilizing means and/or the aforesaid transfer means including a closed cam for driving a follower to intermittently advance each workpiece at a high speed during stabilizing and/or transferring the workpieces incident to a decorating operation.

BRIEF DESCRIPTION OF THE DRAWINGS

The present invention will be more fully understood when the following description is read in light of the accompanying drawings in which.

DETAILED DESCRIPTION OF THE PREFERRED EMBODIMENT

Figure 1:
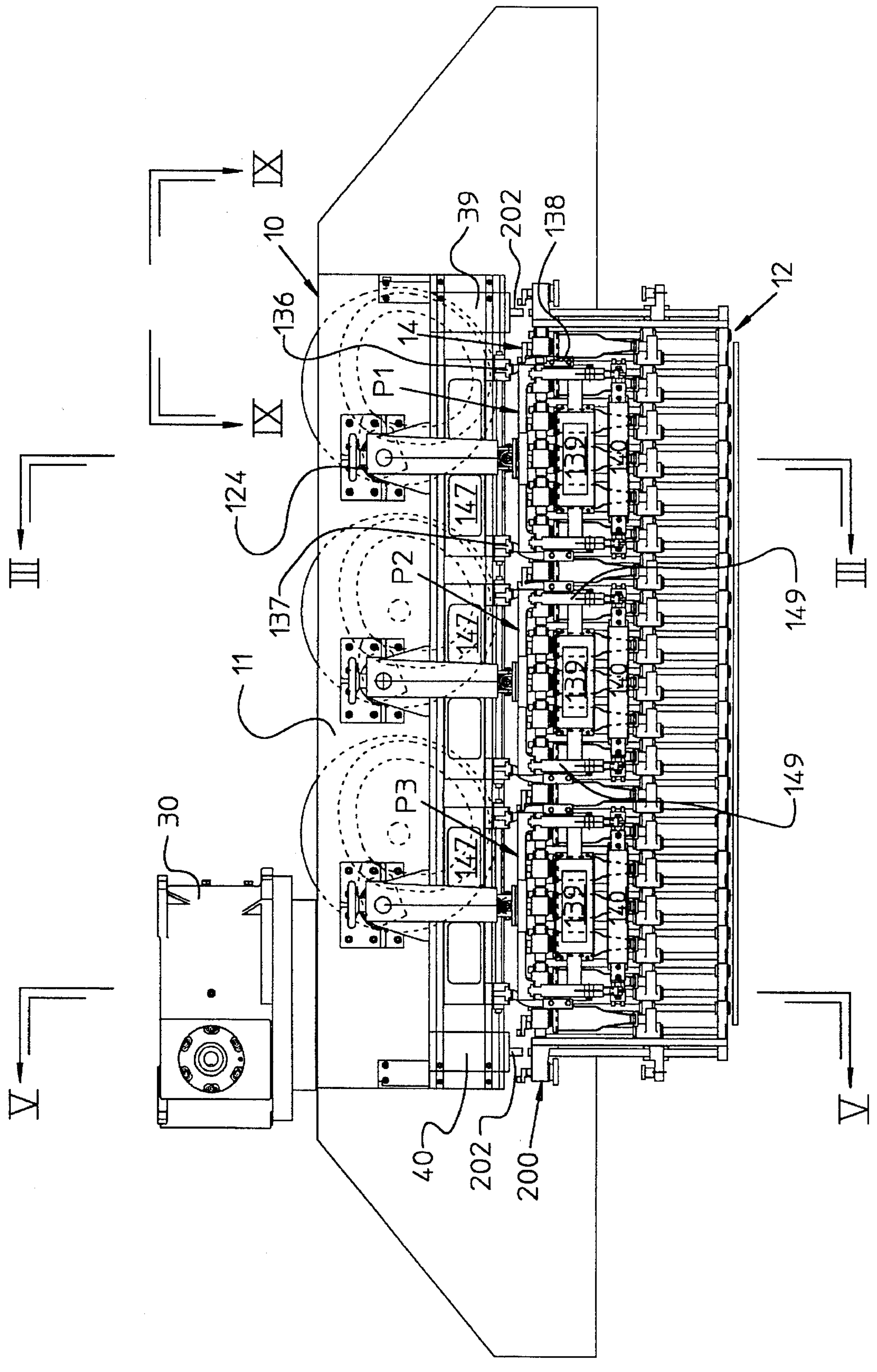
FIG. 1 is a plan view of a decorating machine according to a preferred embodiment of the present invention.

Referring now to FIGS. 1–6 of the drawings, there is illustrated a decorating machine 10 according to a preferred embodiment of the present invention which comprises a base 11 for supporting an endless chain conveyor 12 for conveying workpieces which, for the purpose of describing the preferred embodiment of the present invention, consist of bottles. The conveyor receives bottles from bottle loading equipment 13 and advances the bottles by intermittent motion fashion to a registration station 14 and thence to three successively arranged decorating stations P1, P2 and P3. It is understood that more than three or less than three decorating stations maybe incorporated in the decorating machine without departing from the present invention. The bottles are advanced from the last decorating station P3 to bottle unloading equipment 15.

Figure 5:
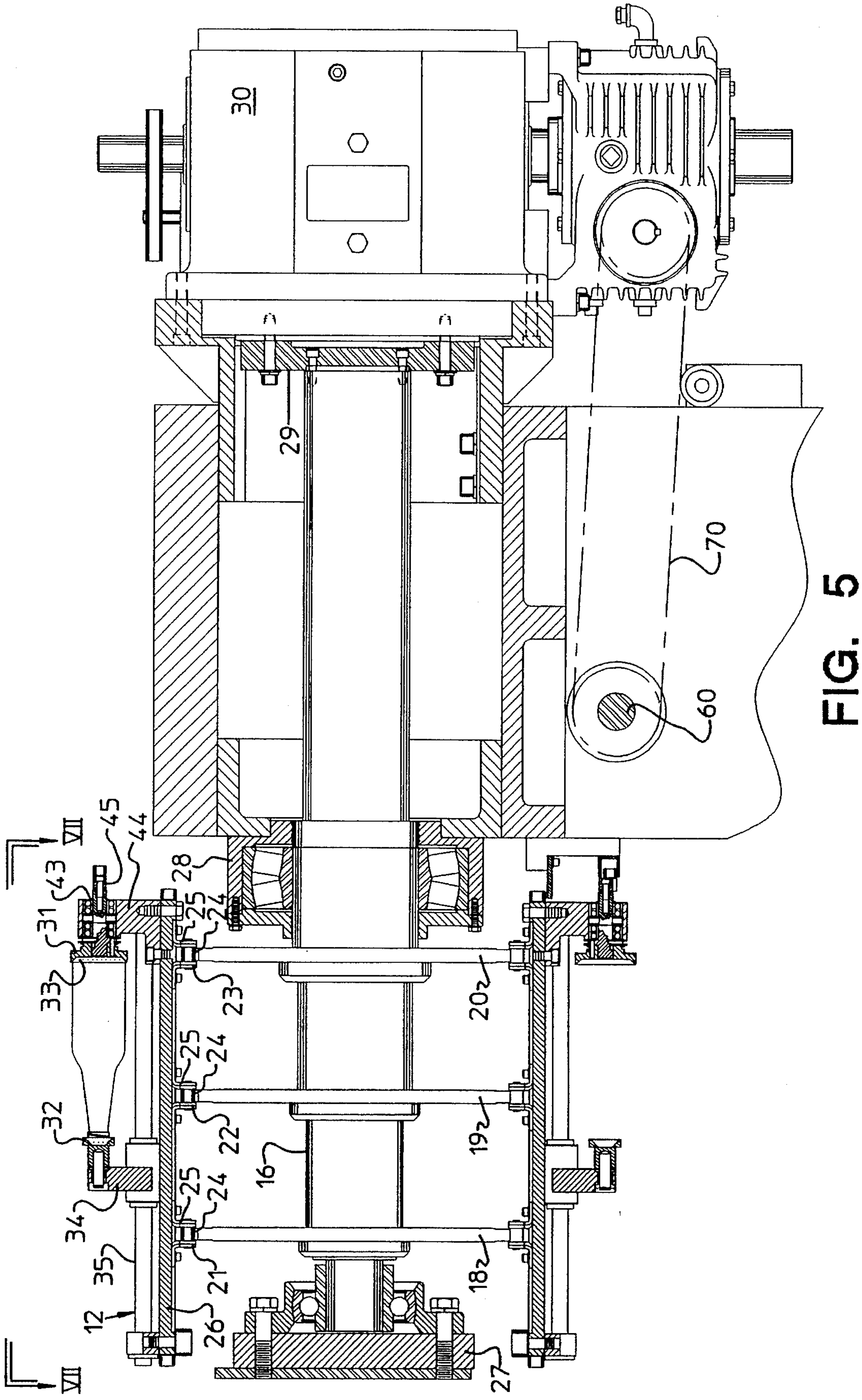
FIG. 5 is a sectional view taken along lines V—V of FIG. 1.
Figure 6:
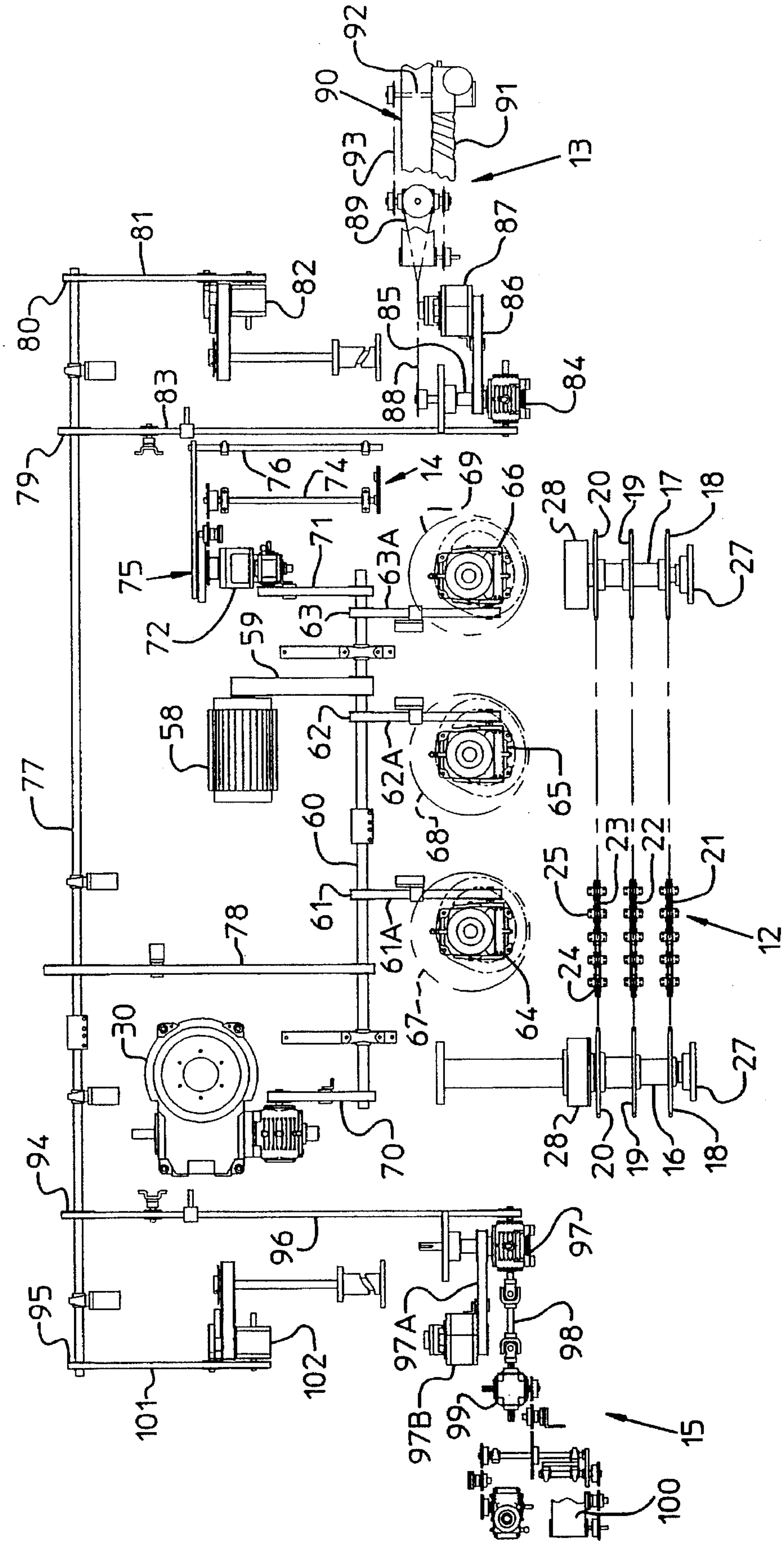
FIG. 6 is a schematic drive layout illustrating the major drive components comprising the decorating machine of FIG. 1.
Figure 7:
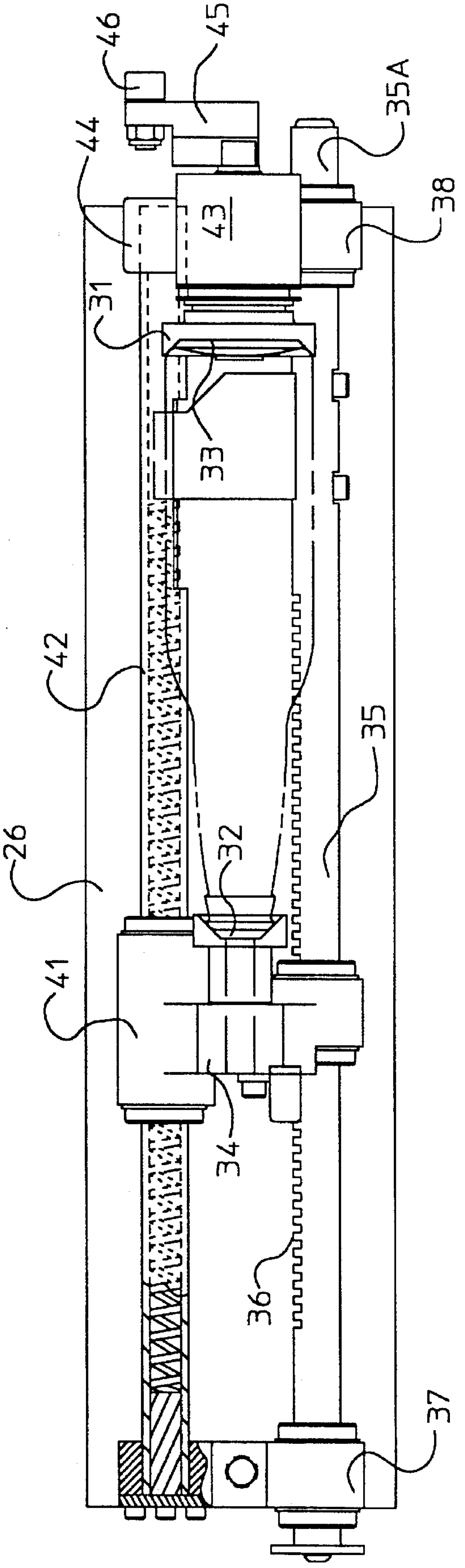
FIG. 7 is a plan view taken along lines VII—VII of FIG. 5.

The conveyor includes spaced apart entry end and delivery end drive shafts 16 and 17, respectively, at the opposite ends of the decorating machine. Each drive shaft 16 and 17 is drivenly engaged with co-axially aligned and spaced apart drive sprockets 18, 19 and 20 with runs of endless chains 21, 22 and 23. Links 24 of each endless chain are interconnected by one of three lugs 25 protruding from the bottom of each of a plurality of carrier plates 26. The sprocket sets 18, 19 and 20 as shown typically in FIG. 5 are mounted on drive shafts 16 and 17 to rotate each by the provision of an outboard bearing support 27 mounted on a sidewall of base 11 and at the inboard side by an inboard bearing support 28 mounted on an upstanding pedestal part of the base 11. At the delivery end of the conveyor, drive shaft 16 has an extended shaft portion extending beyond the inboard bearing support 28 and is secured to a drive plate 29 that is in turn bolted to a drive output member of a conveyor index box 30. The index box imparts intermittent advancing motion to the conveyor 12 while supporting bottles in a horizontal orientation between a base cup 31 and a mouthpiece 32. As shown in FIGS. 5 and 7, base cup 31 has a shallow hollow support surface 33 to receive and engage the base section of the bottle. Mouthpiece 32 is rotatably supported by carrier 34 having diverging support legs one of which is selectively positionable along an actuating shaft 35 having teeth 36 for engaging a releasable latch to allow clamped positioning of the mouthpiece 32 relative to the base cup 31 at any of diverse sites to accommodate a particular height of a bottle between the base cup and mouthpiece. The actuating shaft 35 is slidably supported by spaced apart linear bearings 37 and 38 mounted on carrier plate 26. An end portion 35A of shaft 35 protrudes from the bearing adjacent the base cup 31 for contact with a clamping actuator device 39 located at the bottle entry site (FIG. 1) where the bottle is received by the conveyor 12 and a clamping actuator device 40 located at the bottle discharge site where the bottle is released from the conveyor. As shown in FIGS. 5 and 7, a second leg of carrier 34 is provided with a linear bearing support block 41 resiliently supported by a support shaft 42 in the same manner as disclosed in U.S. Pat. No. 3,338,574 whose disclosure is incorporated herein by reference.

Figure 4:
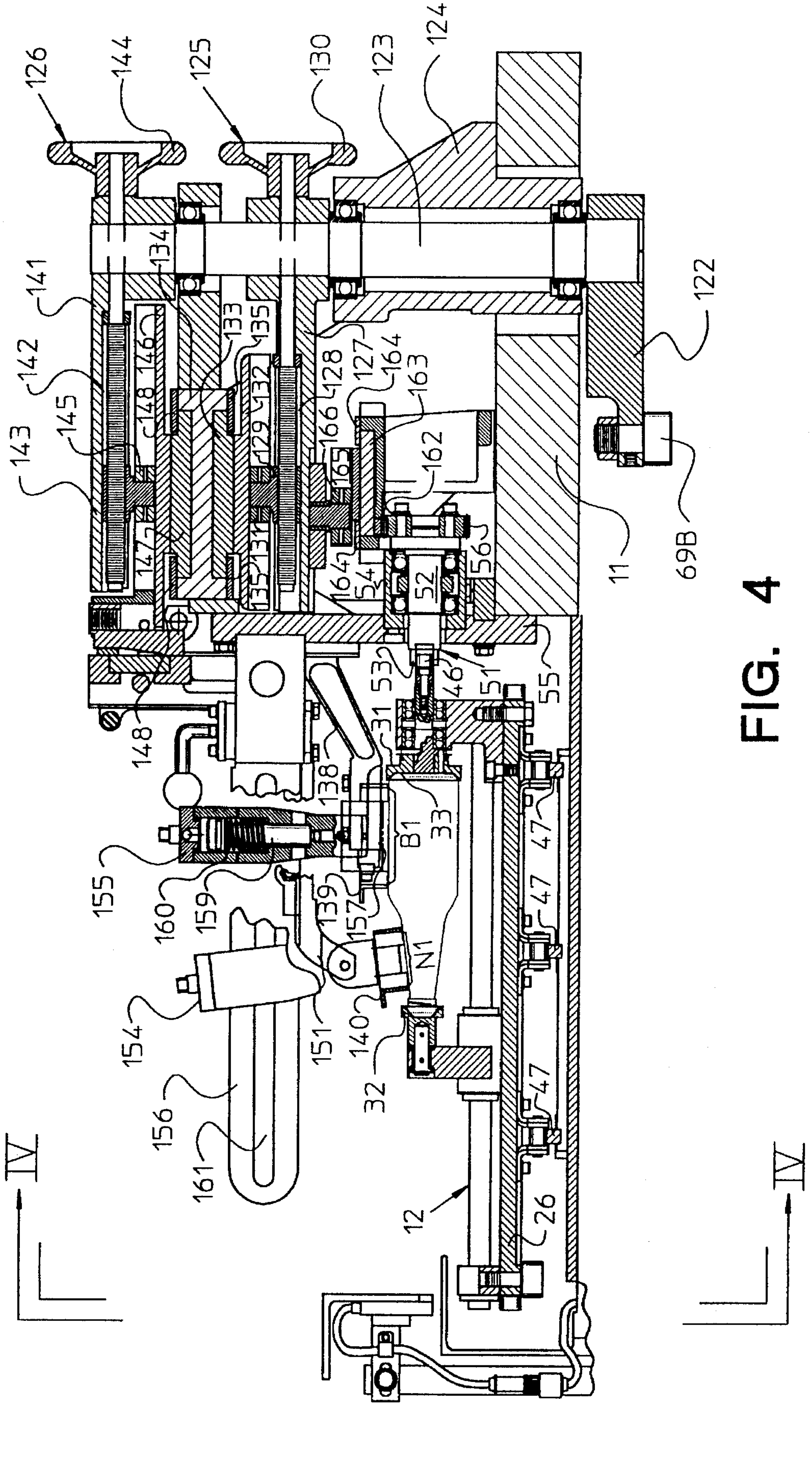
FIG. 4 is an enlarged fragmentary part of the sectional view of FIG. 3.
Figure 4A:
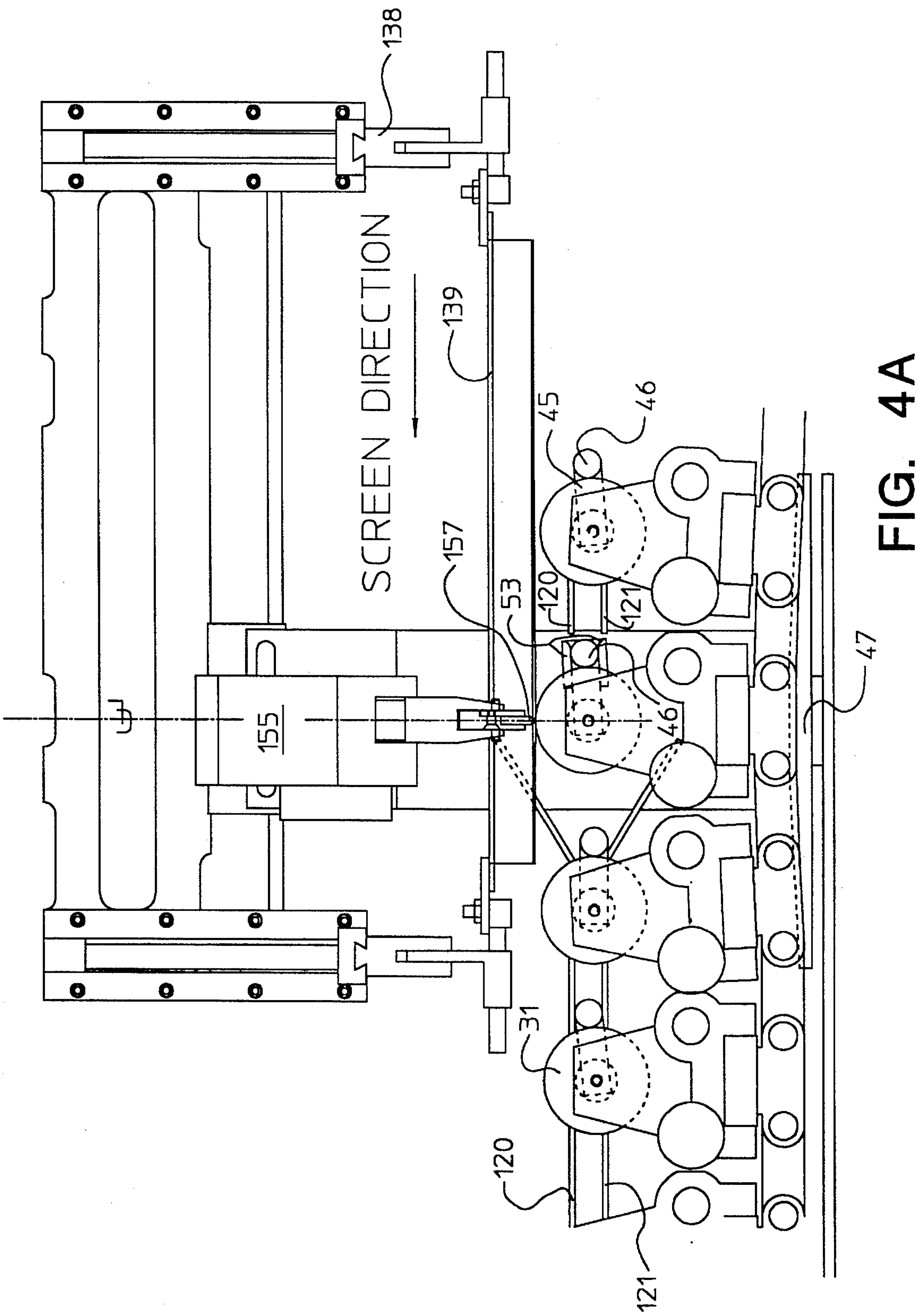
FIG. 4A is an enlarged front elevational view taken along lines IV—IV of FIG. 4.

Extending from the base cup 31 is a journal 43 which is rotatably supported by a bearing in an upstanding housing 44. An end part of the journal is bottled to a crank arm 45 extending perpendicular to the rotational axis of journal 43. The free end of arm 45 supports a drive roller 46 for rotating a bottle at each of the decorating stations as well as the registration station. As will be described in greater detail hereinafter, the crank arms 45 and its drive roller also serve to control the position of the bottle while advanced from decorating station to decorating station by conveyor 12. As best shown in FIGS. 4 and 4A, at each decorating station the chain links of the conveyor ride along bottle riser cams 47 which elevate the bottle a short distance so that the decorating screens can freely reciprocate in either direction without impingement contact with adjacent bottles.

At each decorating station P1, P2 and P3 there is arranged a rotator assembly 51 embodying a construction of parts as best shown in FIG. 4. The rotator assembly includes a rotator arbor 52 having an end portion formed with a slotted opening 53 into which the drive roller 46 can pass into a rotatably driven relationship for rotating the bottle 360° for bottle decorating operations. Arbor 52 is supported for rotation by a bearing in a housing 54 that is in turn secured to a face plate 55 forming part of the base 11 of the decorating machine. The arbor 52 has a portion extending from the bearing housing and to which there is mounted a drive gear 56. As will be explained in greater detail hereinafter, the drive gear 56 is driven by bottle rotating drives at each of the decorating stations. As a bottle carrier approaches each of the decorating stations, the crank arm 45 trails in the direction of conveyor movement so that the drive roller 46 passes into the slotted opening 53 to establish a universal type of drive relation with the rotor arbor 52.

Figure 3:
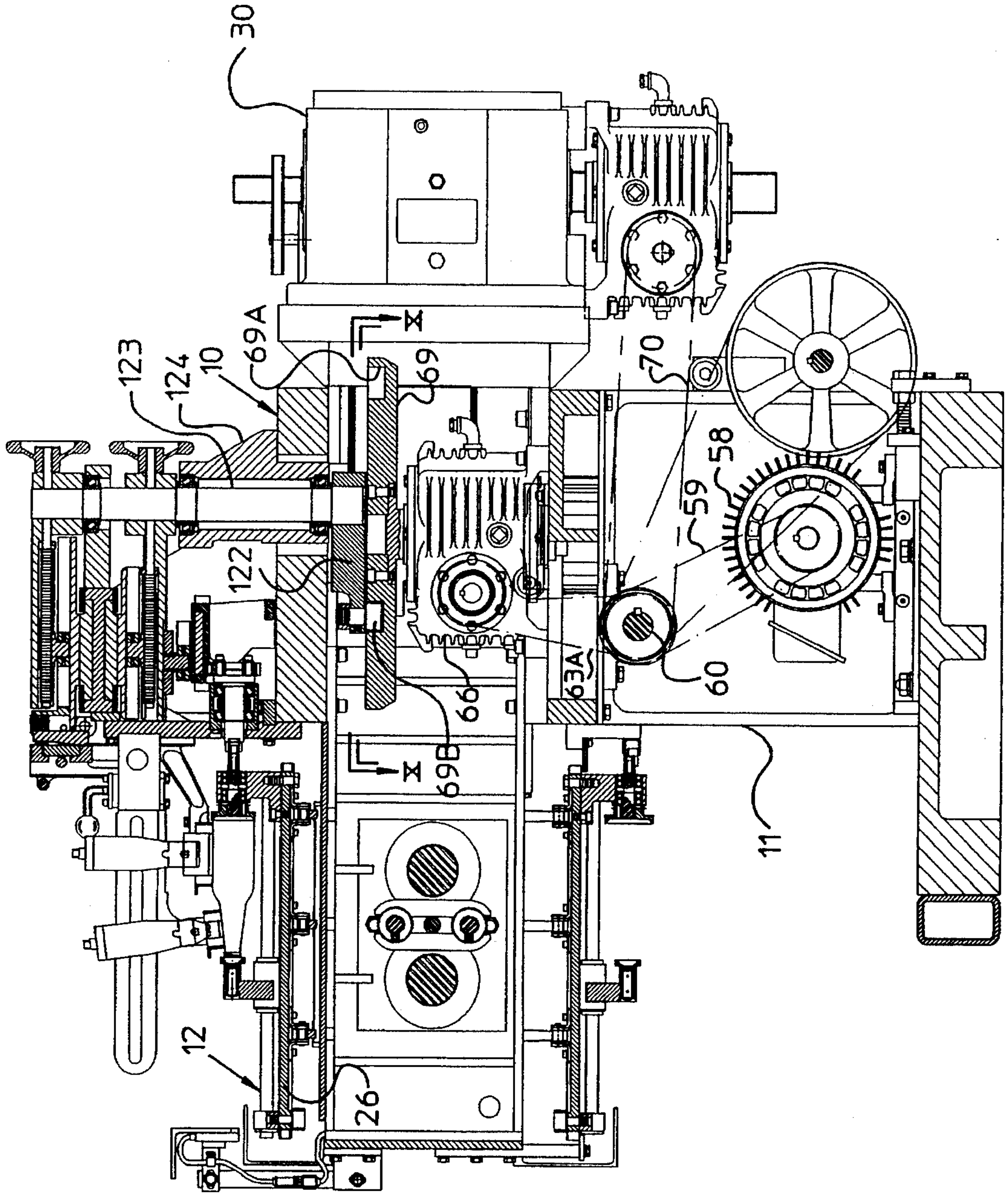
FIG. 3 is a sectional view taken along lines III—III of FIG. 1.

The drive arrangement for the decorating machine includes, as shown in FIG. 3, a main drive motor 58 having a drive output shaft connected by a belt 59 to a first line shaft 60. Spaced along line shaft 60 are three pulleys 61, 62 and 63 provided with belts 61A, 62A and 63A extending to gear drives 64, 65 and 66, respectively. The gear drives have output shafts secured to rotate closed cams 67, 68 and 69. A closed cam is also known as a face groove or positive cam. Each cam has a follower in the respective cam slot to pivot an oscillating drive output. The first line shaft 60 is also provided with a pulley connected by a belt 70 to a drive input shaft of the conveyor index box 30. A further belt 71 connects a pulley mounted on line shaft 60 to a index drive 72 having an output shaft with a sprocket joined by a drive chain 75 to a sprocket mounted on a registration drive shaft 74. The index drive 72 is also drivenly connected by a cam drive 75, to be described in greater detail hereinafter, to oscillate a shaft 76 for a registration head. The first line shaft 60 is drivenly coupled to a second line shaft 77 by a belt 78 trained between pulleys mounted on the line shafts. Line shaft 77 has spaced apart pulleys 79 and 80 of which pulley 80 is connected by a belt 81 to an index drive 82 for a bottle loading apparatus forming part of the bottle loading equipment 13 at the entrance side of the decorating machine. Pulley 79 is connected by a belt 83 to a gear drive 84 having an extended output shaft on which there is mounted a first pulley 85 joined by a belt 86 to a pulley on the drive input shaft of an index drive 87 for a bottle steady forming part of the bottle loading equipment 13. A second pulley mounted on the output shaft of gear drive 84 is connected by a chain 88 to a gear drive 89 for an entry conveyor 90 for bottles. There is a bottle spacing screw 91 per se, well known in the art, and having a drive input shaft 92 with a sprocket connected by a chain 93 to an auxiliary drive output shaft of gear drive 89. Line shaft 77 further includes spaced apart pulleys 94 and 95 of which pulley 94 is connected by a belt 96 to gear drive 97 which in turn drives, by belt 97A, an indexer drive 97B for a bottle steady apparatus forming part of the unloader equipment 15. The gear drive 97 is connected by a universal drive shaft 98 to a gear drive 99 for a take-away conveyor 100 forming part of the bottle unloading equipment 15 at the take away side of the decorating machine. The pulley 95 is provided with a belt 101 for driving an index drive 102 for a bottle unloading apparatus forming part of the bottle unloader 15.

Figure 2:
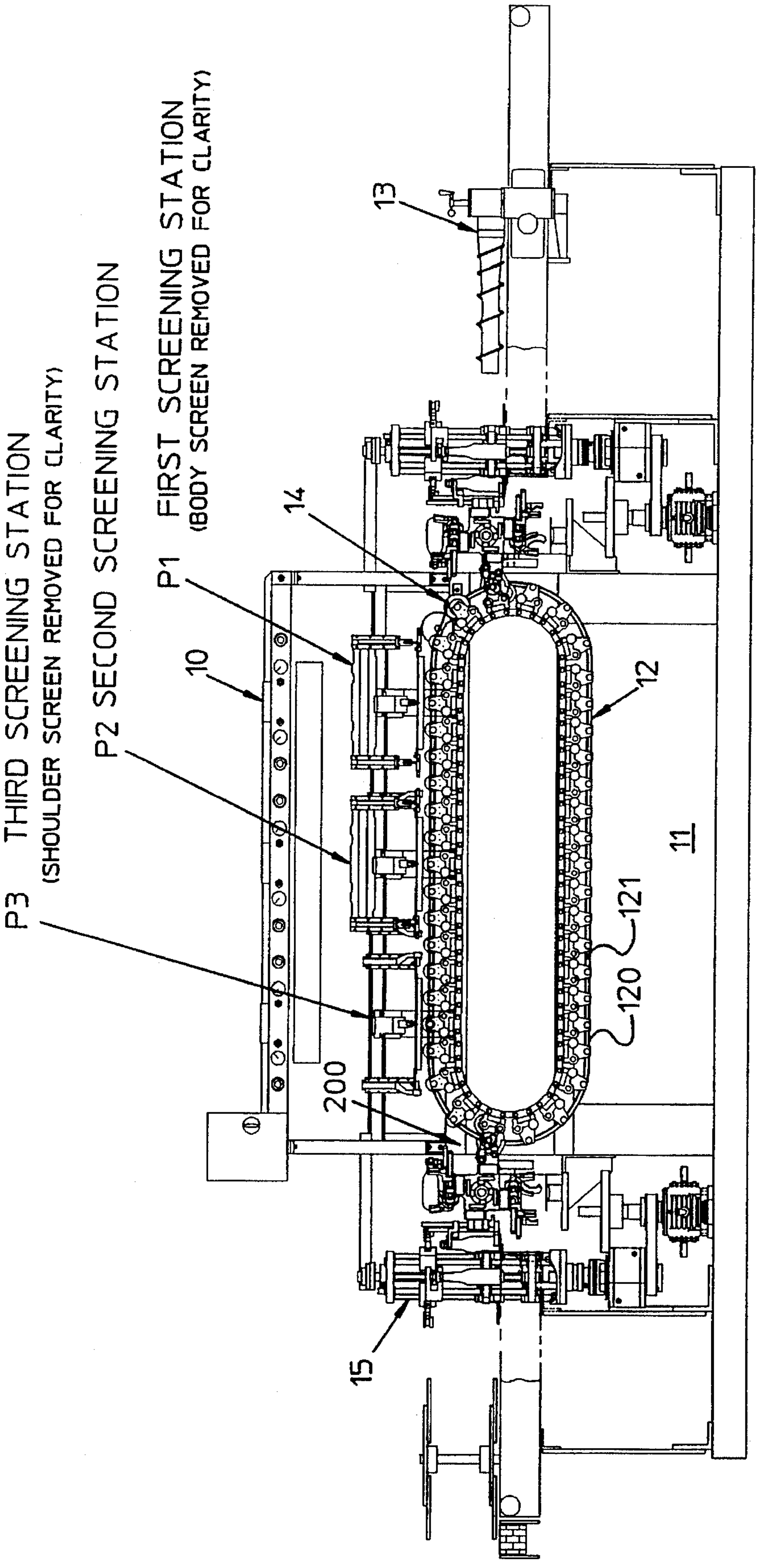
FIG. 2 is an overall front elevational view of the decorating machine shown in FIG. 1.
Figure 8:
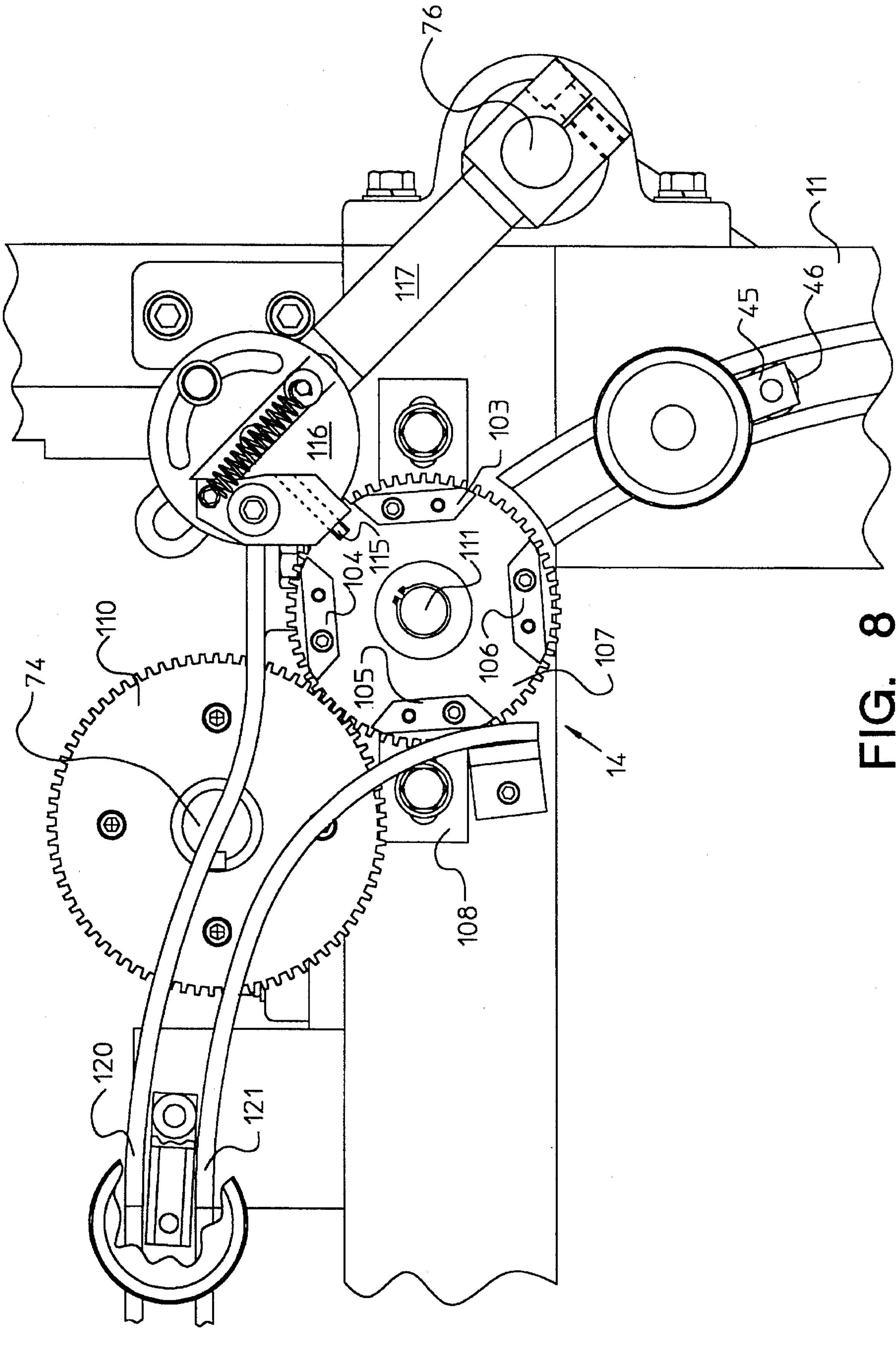
FIG. 8 is an enlarged elevation view of the registration station at the entry side of the conveyor for the decorating apparatus of the present invention.
Figure 9:
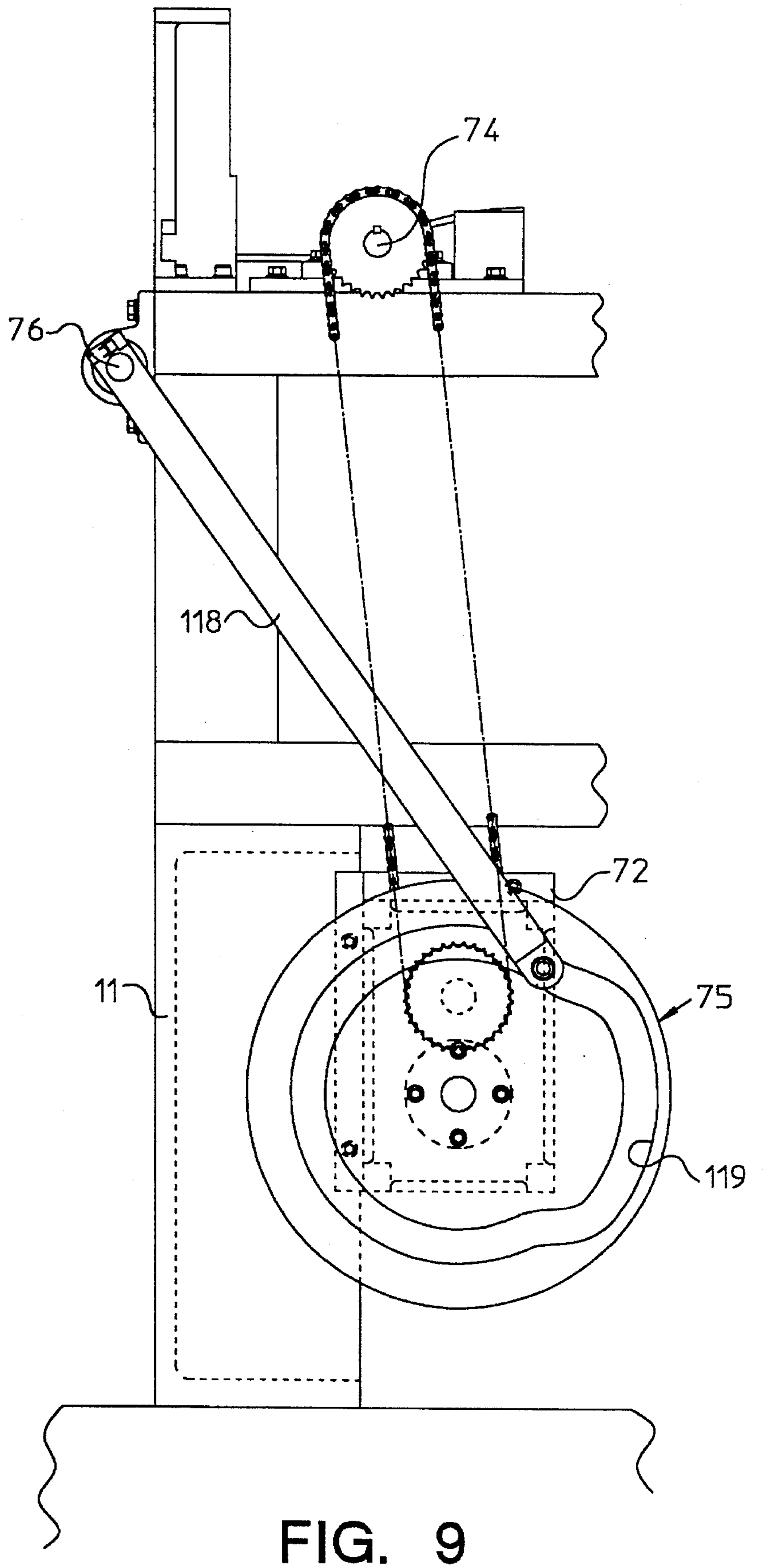
FIG. 9 is an elevation view taken along lines IX—IX of FIG. 1.

As shown in FIGS. 8 and 9, as the bottles are supplied to the decorating machine, as will be described in greater detail hereinafter, the bottles are initially engaged between the base cup 31 and the mouthpiece 32, and thence advanced intermittently to the registration station 14 where the bottle is horizontally orientated. As the bottles arrive at the registration station, the drive roller 46 on the end of the crank arm 45 passes into one of four peripherally spaced openings between drive block 103, 104, 105 and 106 on a face of a gear 107 which is rotatably supported by a bearing in a bearing housing 108 that is turn secured to a frame forming part of the base 11. The gear 107 has gear teeth that mesh with gear teeth of a gear 110 mounted on an end portion of registration drive shaft 74 which as previously described, is driven by a chain drive arrangement shown in FIG. 9 connected to an index drive 72. The bottle is rotated about its longitudinal axis by the bottle rotating drive gear 107 that rotates about a drive axis 111. According to a feature of the present invention, as a bottle carrier approaches the registration station the drive roller 46 of crank arm 45 which trails in the direction of advancing motion passes into the slotted opening between guide blocks 103–106 to establish a universal type of drive relation with journal 43. The driving relation occurs before the index box 30 brings to a halt the intermittent motion of the decorating conveyor. This allows the indexing operation to be carried out over a greater portion of the machine cycle than was heretofore possible and accommodates the greater through-put rate of bottles per minute. An indexing finger 115 is pivotally mounted on a finger mounting plate 116 at a predetermined location along a slotted end portion of a registration arm 117 so that the indexing finger 115 extends into the path of travel of an indexing recess formed in the lower base portion of the bottle. The registration arm 117 is secured to the drive shaft 76 supported by bearings and driven by a pivot arm 118 as shown in FIG. 9 in response to oscillations produced by a follower in a closed cam track 119 also known as a face groove or positive cam driven by a drive output shaft of gear drive 72. The motion imparted to the registration arm 117 moves the index finger into its operative position so that when the index finger passes into the indexing recess of the bottle, rotation of the bottle is stopped thereby, and slippage occurs between the bottle base and the base cup 31 as the cup continues to rotate to completion of each bottle registration cycle. When bottle rotation is stopped there is established a predetermined bottle orientation with respect to the decorating screens. The registration process is particularly useful to orientate seam lines extending along opposite sides of a bottle with respect to the location of the desired area for decoration. Registration of the bottle is concluded with the orientation of the crank arm 45 such that the drive roller 46 trails the advancing movement of the bottle carrier in an intermittent fashion to the decorating stations. As the drive roller 46 emerges from a slot between the drive blocks 103–106, the roller is captured and guided by spaced apart guide rails 120 and 121. These guide rails extend along the course of travel by the drive roller 46 throughout the indexing movement by the conveyor to thereby maintain registration of the bottle at each decorating station. As shown in FIG. 2, the guide rails 120 and 121 form an endless path to capture the roller and guide the crank arms.

At each decorating station P1, P2 and P3 as shown in FIGS. 3 and 4, the arrangement of apparatus is identical. It can be seen that the gear drive 66 has its output drive shaft connected to rotate the cam 69. A cam track 69A is machined into the closed cam 69 and received in the cam track is a cam follower 69B. The cam follower is mounted to a lever arm 122 which is in turn secured to the lower end of a vertical shaft 123. The shaft 123 is supported by spaced apart bearings, as shown, which are in turn carried by a tubular column 124 supported by the base of the decorator machine 11. At the top of the column 124 there are superimposed oscillation arm assemblies 125 and 126. As shown in FIG. 4, assembly 125 is made up of a lever arm 127 secured to shaft 123 and provided with a guideway 128 extending radially of the shaft. In the guideway there is arranged a drive bar 129 which can be moved along the guideway by the threaded portion of a hand wheel 130. The distance the drive bar 129 is located radially of the rotational axis of shaft 123 is controlled by the hand wheel 130. A drive block 131 is mounted on a portion of the drive bar 129 projecting vertically above the guideway and reciprocates in an inverted "U" slot formed in a drive bar 132. The drive bar is joined to a slide 133 supported in a slide way 134. The slide is held in a slot of guideway 134 by gib plates 135. While not shown, the slide 133 protrudes laterally from opposite sides of the tubular column 124 and is provided with outwardly spaced apart receiver arms 136 and 137. These receiver arms engage with a support frame 138 for decorating screen 139 that are reciprocated by the linear motion of the slide to thereby reciprocate the screen along the body portion B1 of a bottle for carrying out decorating operations thereon. Similarly, the neck portion N1 is decorated by a decorating screen 140 which is reciprocated by the oscillating arm assembly 126. Assembly 126 includes a lever arm 141 secured to shaft 123 and provided with a guideway 142 extending radially of the shaft. In the guideway there is arranged a drive bar 143 which can be moved along the guideway by the threaded portion of a feed screw operated by a hand wheel 144. The distance the drive bar 143 is located radially of the rotational axis of shaft 123 is controlled by the hand wheel 144. A drive block 145 is mounted on a portion of the drive bar 143 projecting vertically downwardly from the guideway and reciprocates in a "U" shaped slot formed in a drive bar 146. The drive bar is joined to a slide 147 supported in a slide way 134. The slide 147 is held in a slot of slide way 134 by gib plates 148. As shown in FIG. 1, the slide bar 147 protrudes laterally from opposite sides of the tubular column 124, in the same manner as slide 133 protrudes and is provided with outwardly spaced apart receiver arms 149. These receiver arms engage with a support frame 151 for the decorating screen 140 reciprocated at an angle corresponding to the angle of the truncated conical portion of the neck portion N1 of the bottle for carrying out decorating operations thereon. Handwheels 130 and 144 are used to select a desired stroke for the screen reciprocation to match the circumferential distance of the bottle which is to be decorated. This matching relationship is critically significant because no relative speed between the screen movement and the bottle rotation can be accepted otherwise, smearing or poor quality decorating will occur. Squeegees 154 and 155 are carried by a support arm 156 in positions above the screens 139 and 140, respectively. The squeegee construction is per se is known in the art and is shown in U.S. Pat. No. 3,172,357. Each squeegee includes a squeegee rubber 157 on the end portion of squeegee positioning cylinder 159 operated pneumatically against the force of a return spring 160 thereby to establish line contact between the screens 139 and 140 and a bottle as the bottle is rotated in a synchronous speed with linear movement of the screens. The squeegees are adjustably located by fasteners engaged in a mounting slot 161 extending along the elongated length of the support arm 156.

At each decorating station there is provided as part of the screen drives, a drive to rotate the rotator assembly 51. As described previously, the rotator assembly includes a gear 56 which is located beneath lower arm 127 where the teeth of gear 56 mesh with teeth of an elongated rack 162. Rack 162 is secured to a slide 163 which is constrained by gibs 164 to reciprocate in a slideway 163 in response to a driving force imparted to a "U" shaped drive bar 165. The driving force is imparted by a drive block 166 mounted in a slot formed in the underside of lower arm 127. Drive block 166 serves to convert oscillating motion of lower arm 127 to linear motion of the slide thereby reciprocating the rack 162 for rotation of a bottle through 360° for a decorating operation.

Figure 10:
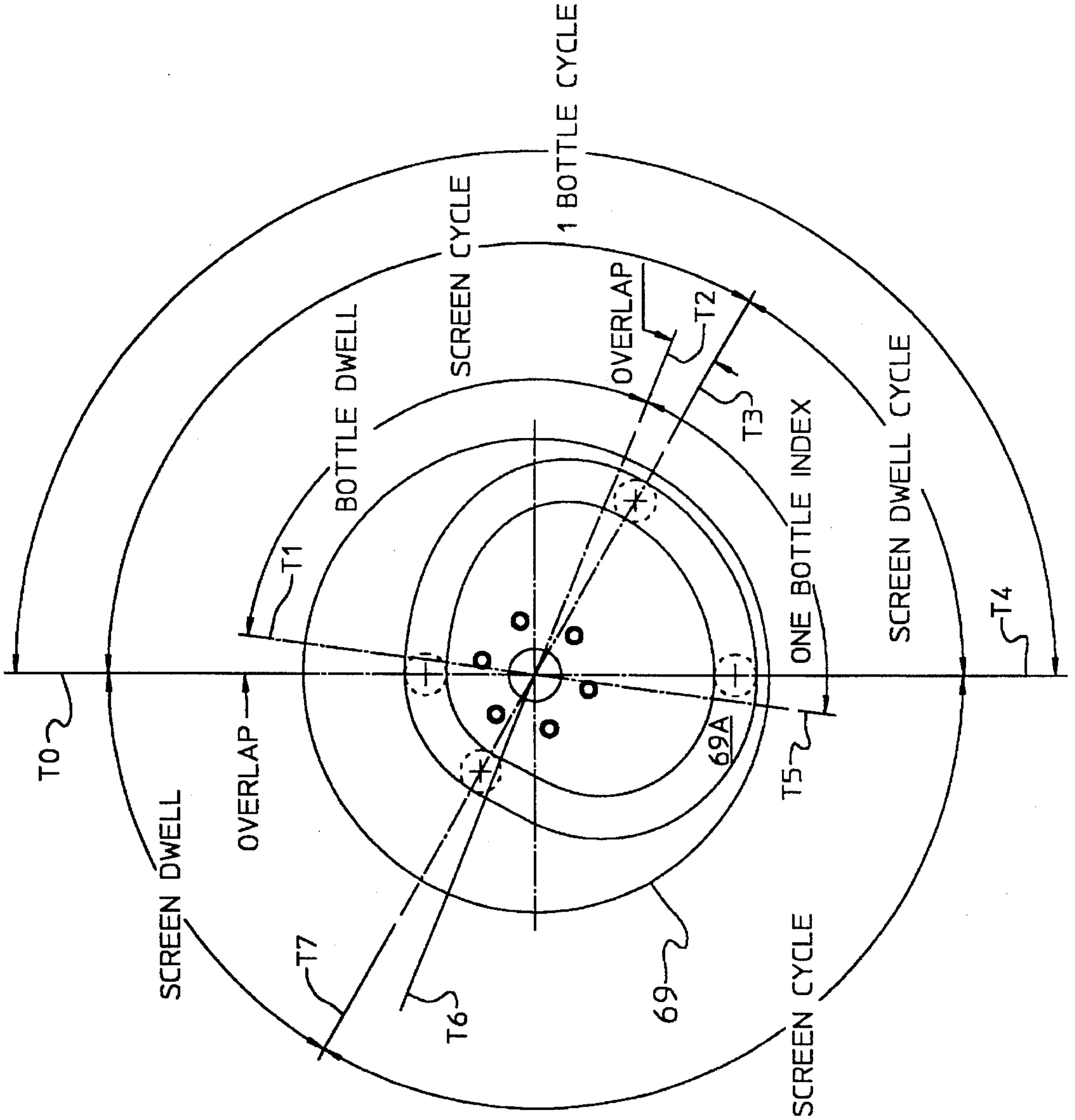
FIG. 10 is a sectional view taken along lines X—X of FIG. 3 showing the cam track for reciprocating the decorating screens and rotating the bottles for a decorating operation.
Figure 11:
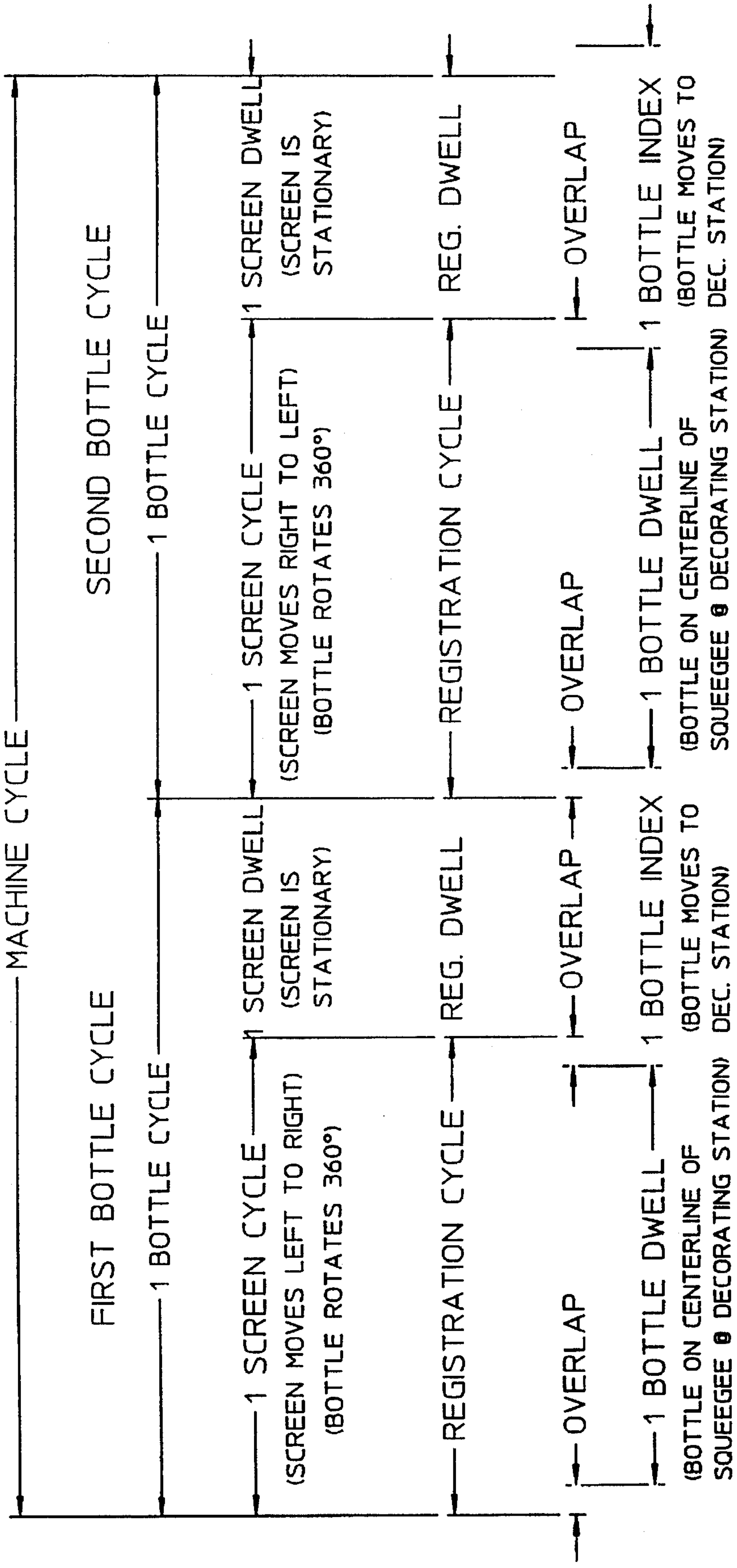
FIG. 11 is a timing sequence diagram showing the decorating cycle achievement shown in FIG. 6 and the intermittent advancement of the bottle.

According to the present invention, high speed decorating of bottles at each decorating station is carried out in an identical fashion by initiating screen travel before a bottle completes its final advancing motion by the conveyor driving index box 30 to the decorating station and continuing with a final part of screen travel after movement of the bottle is initiated from the decorating station by the conveyor driving index box. For this purpose it can be seen from FIG. 10 showing the cam track and from FIG. 11 showing a timing sequence, that the cam track 69A establishes two bottle decorating cycles. In the first cycle, the decorating screen is linearly displaced in one direction during which one bottle is decorated and then the screen is reciprocated in the opposite direction during which a succeeding bottle is decorated. The cam track defines the precise occurrence of events with respect to the intermittent movement of the bottle by the index box since the cam and the index box are drivenly interconnected in the same drive train all driven by motor 58. The index box converts the continuous input rotation to short periods of output rotation used to intermittently advance the conveyor.

As can be seen from FIGS. 10 and 11, a machine cycle begins with screen travel along a linear path in response to movement of the follower in cam track 69A from a site designated T0. The phase of linear screen movement continues until the follower reaches position T3 whereupon movement of the screen is brought to a halt. The actual decorating of the bottle is completed during a screen decoration cycle defined by the time the cam follower proceeds from site T0 to T3 due to rotation of the cam. The period when the cam follower proceeds from position T3 to T4 defines a screen dwell period during which the decorating screen remains stationary. In the past, the decorating cycle and the screen dwell period consumed equal parts of one-half of the machine cycle, however, to increase the rate at which the bottles are decorated, the present invention provides that the decorating cycle consumes a major part and the screen dwell cycle a minor part of one-half of the machine cycle. The second half of the machine cycle is initiated with the decoration of a second bottle whereby at the conclusion of the machine cycle the cam follower is at position T0. In the second half of the machine cycle, the screen is opposite reciprocating along a linear path of travel for a decorating cycle as the cam track advances the cam follower from position T4 to T7. A screen dwell cycle completes the second half of the machine cycle as the cam follower is moved from position T7 to a start position for succeeding machine cycle at position T0. Interleaved with the decorating cycle and the screen dwell cycle are a bottle dwell period and a bottle index period. The bottle dwell period begins at a point in the first half of the machine cycle during the decorating cycle at time T1 and ends at time T2 before the conclusion of the decorating cycle at time T3. The bottle dwell cycle represents the period of the machine cycle while the bottle remains stationary as to translating movement by the conveyor but is rotated so that the surface of the bottle to be decorated remains synchronous with the linear movement of the decorating screen. The bottle index period begins, according to the present invention, at time T2 before the screen reaches the end of its linear movement and equally significant is that the bottle index period continues for a period ending at time T5 which is after the commencement of the screen travel at time T4 in the second half of the machine cycle. At time T5 when the bottle index period ends, there commences the bottle dwell cycle which continues through to period T6 which is in the second half of the machine cycle. Between time T5 and T6, the bottle rotates 360° in a decorating process°. The overlap between the screen movement and the bottle indexer occurring at T0 to T1 allows the velocity at which the screen moves along its linear path to remain within acceptable limits of inertia of the driving parts for the screen reciprocation while the bottle indexing and rotating equipment can operate at higher speeds and still remain within acceptable limits of the inertia of the driving parts.

By way of an illustrative example, the machine cycle of FIG. 11 can be carried out by providing that in a bottle cycle the screen cycle wherein the screen moves left to right and the bottle rotates 360° can occupy 240° of the machine cycle and the screen dwell cycle wherein the screen is stationary occupies 120° of the machine cycle. The bottle dwell cycle wherein the bottle remains on the center line of the squeegee at the decorating station will consume 210° of the machine cycle. The bottle index cycle will consume 150° of machine cycle which overlaps between the first bottle cycle and the second bottle cycle provides that a bottle move in an intermittent fashion a distance sufficient to remove a decorated bottle from the decorating station and concurrently carry out entrance of a successive bottle to the printing station. This provides that the overlap between the machine cycle and the bottle dwell cycle at the beginning of the screen cycle and at the end of the screen cycle will be 15° of the machine cycle. The allocation of the duty cycle between the screening, screen dwell, bottle dwell and bottle index are established by the configuration of the closed cam surface 69A interleaved with the duration of the intermittent output motion by the indexer box 30 which is used to intermittently advance workpiece from decorating station to decorating station of the decorating machine. By increasing each overlap from, for example, 15° to a greater part of the machine cycle the through put decoration rate may be increased. Such a bottle through put rate for an intermittent bottle decorating machine is achieved without compromise to the decorating quality since the velocity of the screen being reciprocated back and forth can remain within acceptable limits for establishing a synchronous speed relation between the velocity of the screen and the speed of the bottle surface to be decorated. As the through put rate is increased, the present invention allows an increase to the screening cycle by occupying a greater duration of the machine cycle and a reduction to the screen dwell cycle.

Figure 12:
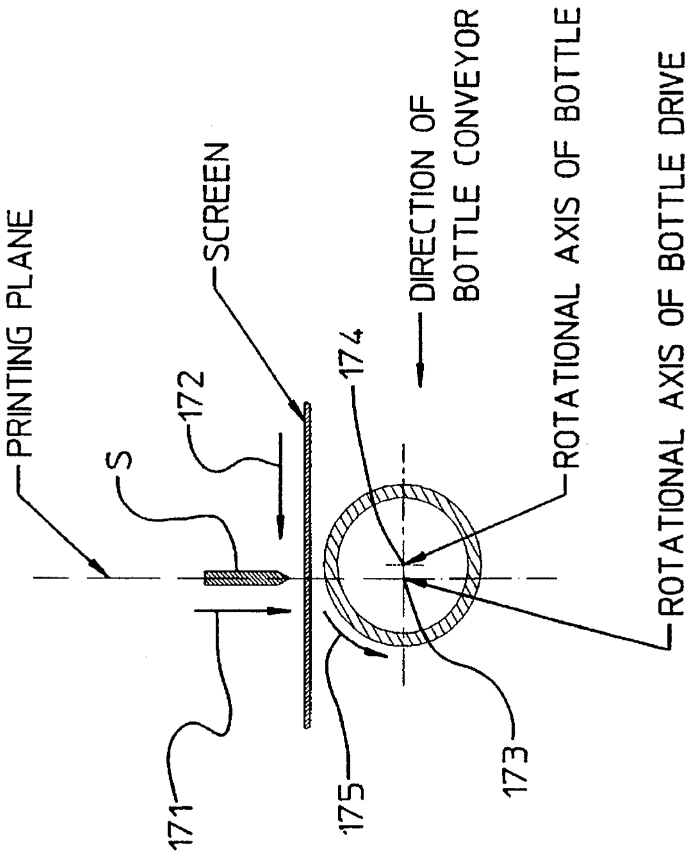
FIG. 12 is a schematic illustration of a bottle at the final stage of movement to the printing plane at a printing station according to the present invention.

FIG. 12 illustrates the relationship of the bottle in the decorating apparatus at time T0. It will be observed that a decorating plane is defined by a vertical plane passing through a squeegee S. The squeegee is being moved downwardly in the direction indicated by arrow 171. The screen initiates linear movement in the direction of arrow 172. The bottle commences rotation by a rotator assembly 51 which is driven to rotate about axis 173 that is laterally displaced from bottle rotational axis 174 in a direction indicated by arrow 175.

Figure 13:
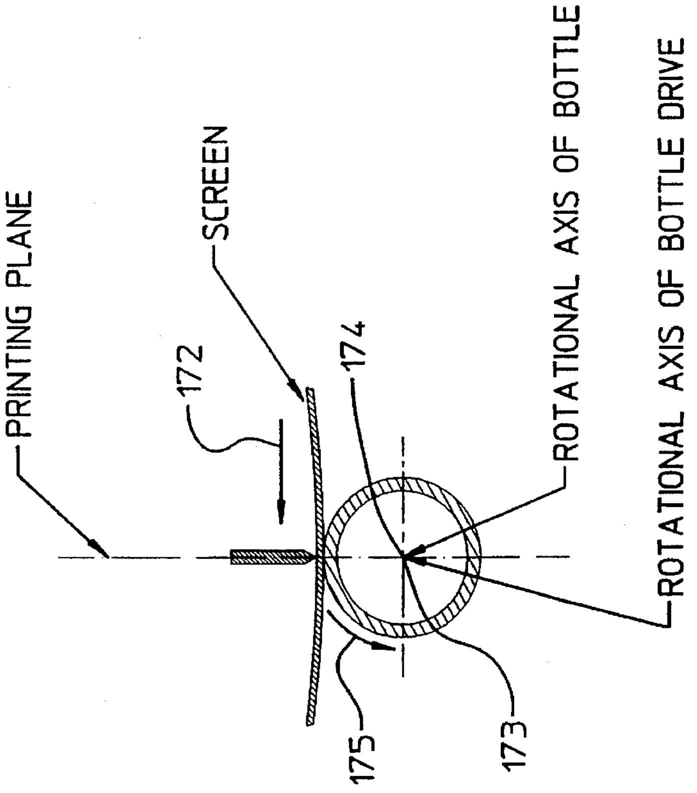
FIG. 13 is a view similar to FIG. 12 and illustrating a relationship of parts during a printing operation according to the present invention.
Figure 14:
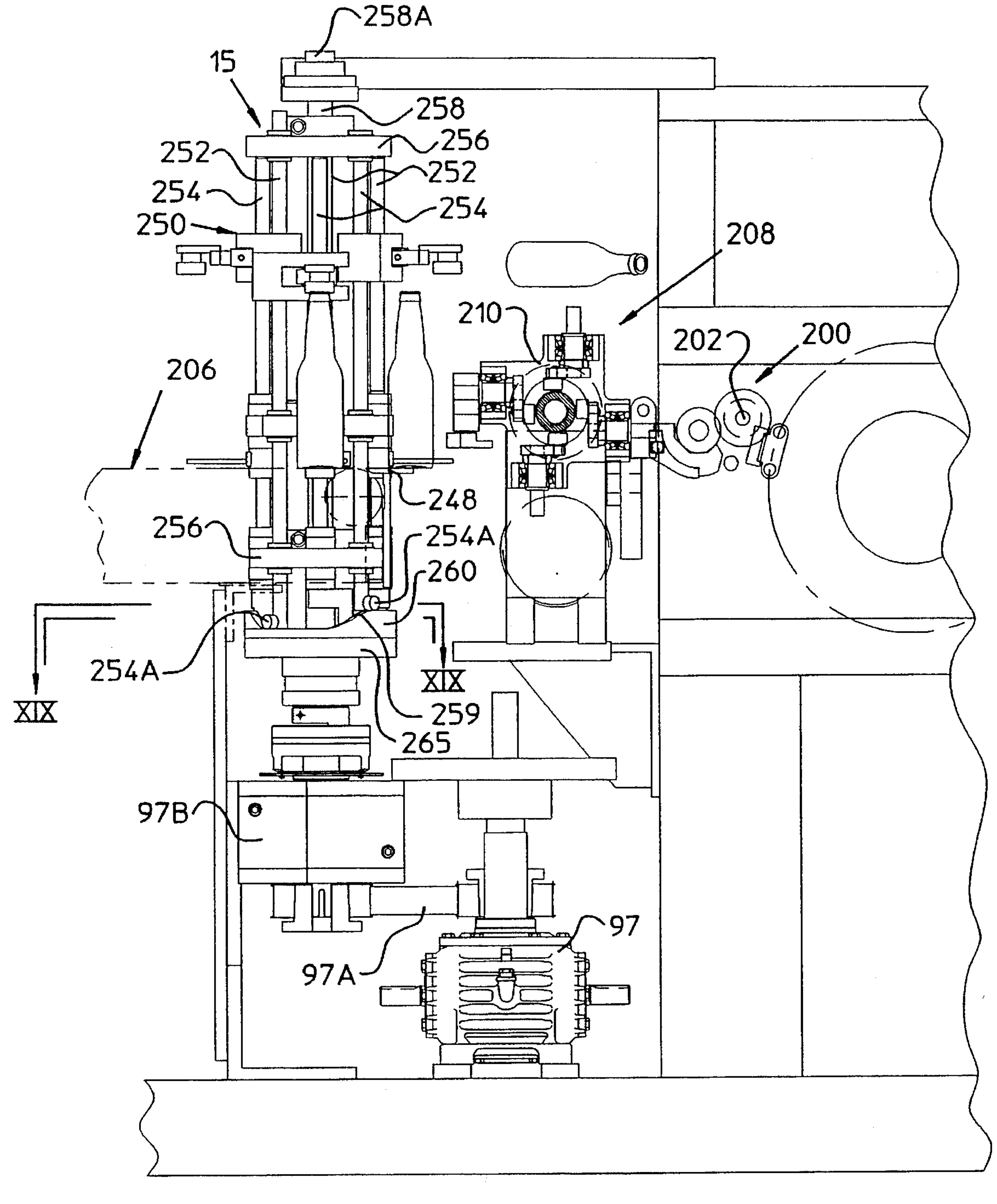
FIG. 14 is an elevational view partly in section showing the operator side of the bottle transfer and bottle steady devices at the discharge end of the conveyor of the decorating machine.
Figure 15:
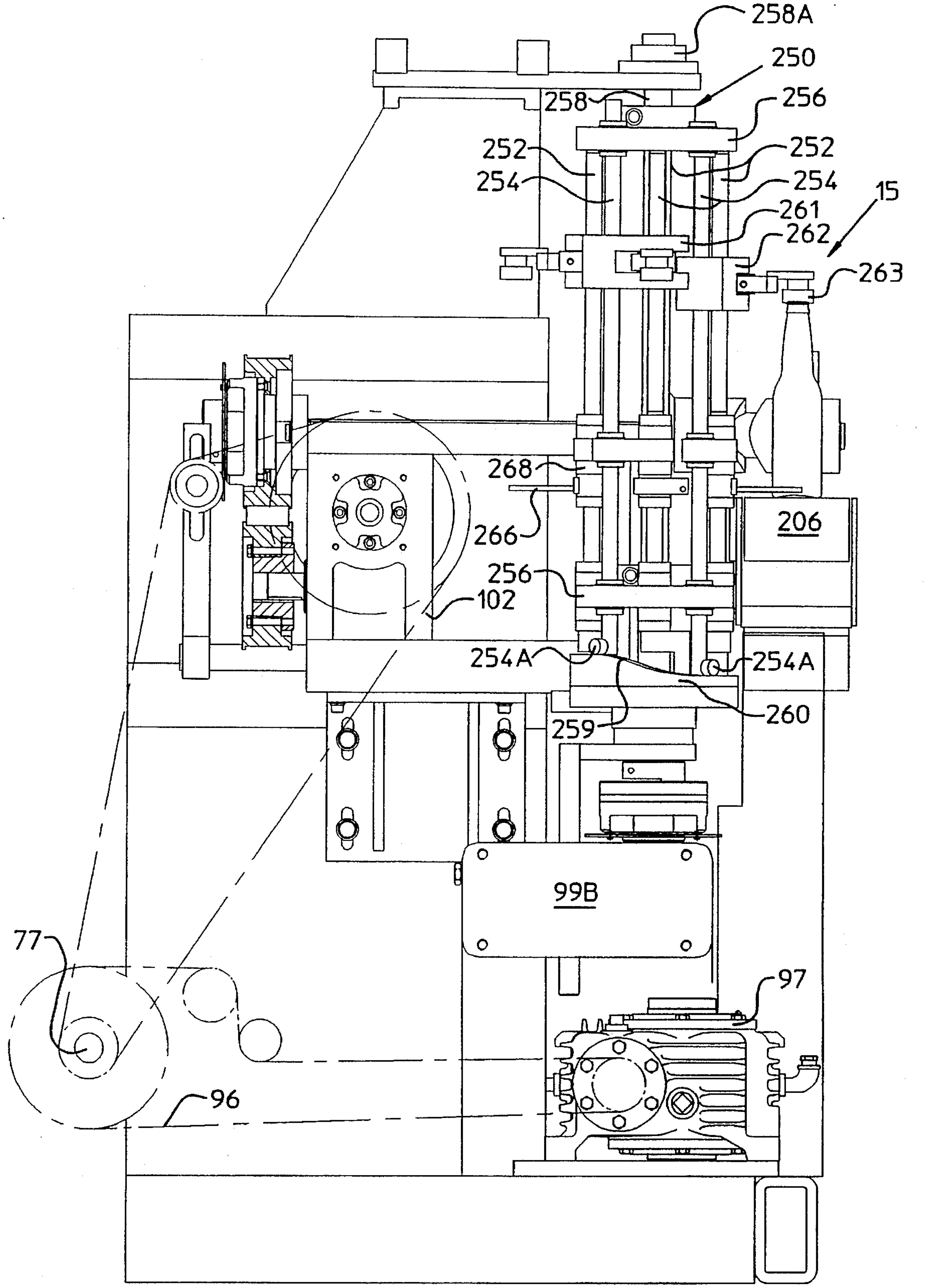
FIG. 15 is an elevational view partly in section showing the drive side, which is opposite the operator side of FIG. 14, of the bottle transfer and bottle steady devices at the discharge end of the conveyor of the decorating machine.

In FIGS. 4A and 13 time T1 is depicted by the relationship of the bottle in the decorating apparatus. It can be seen that the bottle has been moved upwardly by the bottle riser cams 47 (FIG. 4) at each printing station where a bottle is lifted for the bottle dwell period. The squeegee has pressed the decorating screen into contact with the bottle as the bottle rotates about axis 174 which now coincides with the rotational axis 173 of the bottle rotator.

After the workpieces have been advanced from the last decorating station, they are moved through operation of the indexer drive 30 to a predetermined discharge transfer site 200 whereat the plunger rod 202 is operated by the actuator device 40 which is reciprocated by a cam in a direction of its length into engagement with actuating shaft 35A of the carrier to release the mouth piece 32 from the mouth of the bottle and thereby allow recovery of the bottle from the bottle support assembly of the conveyor. Referring to FIGS. 14–19, a further important feature of the present invention resides in the construction of the bottle unloading equipment 15 to transport the bottles as they are successively presented by the chain conveyor 12 where they are horizontally orientated between the base cup 31 and mouth piece 32 to a delivery conveyor 206 in a generally vertical orientation. Because of the increased speed at which the bottles are supplied intermittently to the bottle unloading equipment, the mass of the equipment and the mass of the bottles, it is necessary to offset the forces of inertia by holding the bottles captive and using a closed cam track in the drive system to positively and drivingly interlock the components together so that forces due to inertia as a result of rapid start and stop motions can be controlled while manipulating each bottle without accidental release of the bottle or other unwanted mishandling. In the past, springs were used such as shown in U.S. Pat. No. 3,648,821 to bias conjugate pairs of naturally perpendicular workpiece carriers in a direction so as to maintain associated cam rollers engaged with a cam track. Merely using stronger spring forces is ineffective to prevent separation of the cam roller from the cam track due to the required rapid intermittent motion when handling bottles at a rate of 150 per minute and greater.

Figure 16:
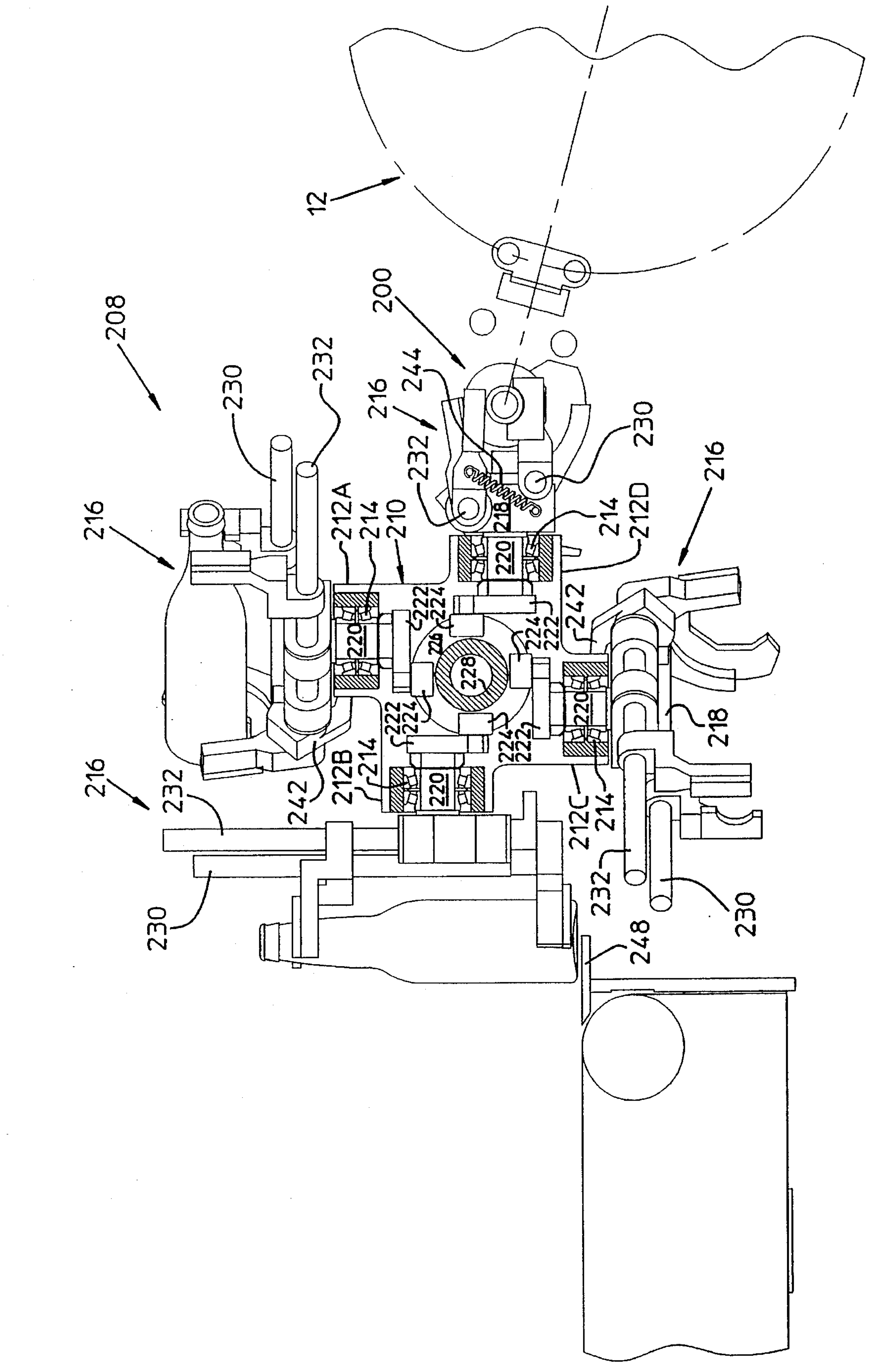
FIG. 16 is an enlarged elevational view of the bottle transfer apparatus as shown in FIG. 14.
Figure 17:
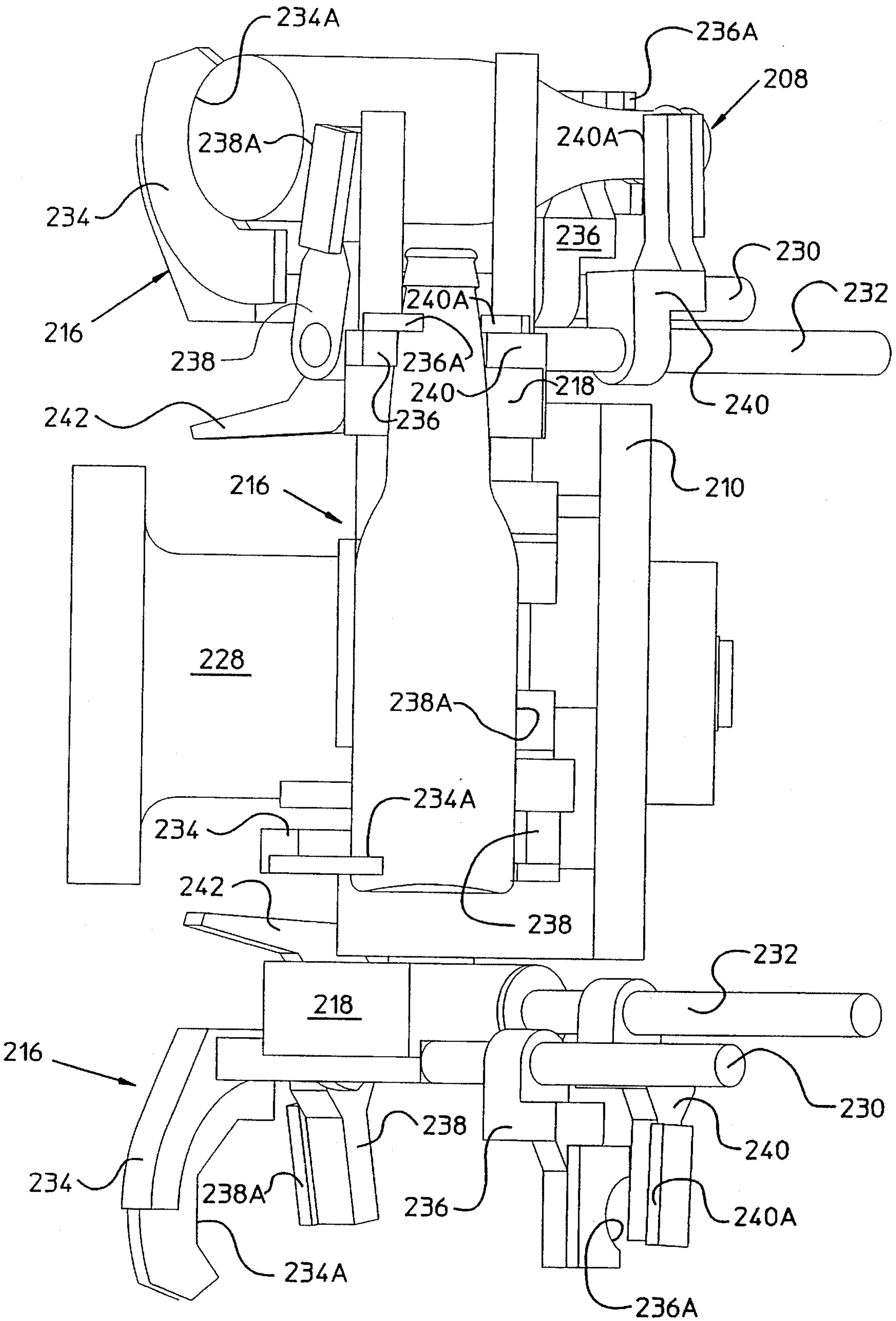
FIG. 17 is an enlarged plan view of the bottle transfer apparatus shown in FIG. 16.
Figure 18:
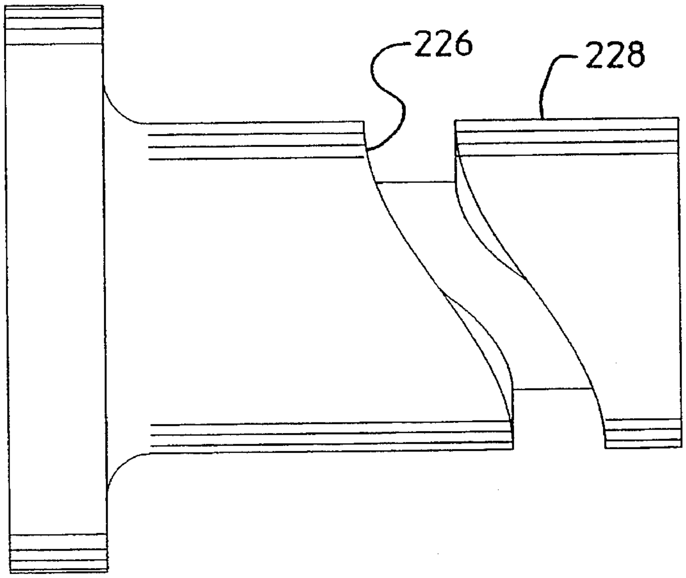
FIG. 18 is a plan view of a barrel cam forming part of the transfer apparatus shown in FIGS. 16 and 17.

Thus, according to the present invention a transfer apparatus 208 is arranged to receive the bottles from discharge transfer site 200. The transfer apparatus takes the form of a turret body 210 rotatably supported to rotate about a horizontal axis in an intermittent motion in response to the drive output of cam drive 102. As best shown in FIGS. 16 and 17, the turret 210 has four limbs 212A, 212B, 212C and 212D whereat each limb is provided with an anti-friction bearing 214 to support one of identically constructed bottle carrier assemblies 216. Each carrier assembly includes a base 218 having a journal 220 rotatably supported by bearing 214 and carrying a crank arm 222. The crank arm supports a cam roller 224 at its free end in the position to extend into a cam slot 226 of a barrel cam 228 (FIG. 18). The barrel cam 228 is mounted on a support pedestal and remains stationary. The base 218 pivotally supports rod 230 and rigidly supports rod 232. Rod 230 in turn supports spaced apart bottle carrier arms 234 and 236 of which arm 234 is arranged at one end of rod 230 where a C-shaped bottle engaging surface 234A is directed to engage by a nested relation with the base of a bottle while at the opposite end portion, rod 230 carries arm 236 having a bottle engaging surface 236A directed to engage by a nested relation with the neck portion of the bottle. Rod 232 supports spaced apart carrier arms 238 and 240 of which arm 238 is arranged at the end of rod 232 to engage by a "C" shaped bottle support surface 238A the base of the bottle generally opposite arm 234 and thereby positively retain the bottle between these arms when in a gripping relation. Similarly, the end portion of rod 232, opposite arm 238, supports arm 240 in the position for neck support surface 240A to engage with the neck portion of the bottle generally opposite of arm 236 to thereby positively retain the bottle between arms 236 and 240 when in a gripping relation. An actuating lever 242 is secured to an end portion of rod 232 for rotating the rod about the longitudinal axis of the rod for moving arms 238 and 240 in to and out of a gripping relation with the bottle. The lever 242 is actuated when a bottle carrier assembly associated therewith is positioned at the discharge transfer site 200 to move arms 238 and 240 into gripping relation with the bottle which is maintained throughout translating motion of the arms and bottle supported thereby by a spring biasing force on arms 238 and 240 provided by springs 244 (FIG. 16). After a bottle has been wholly supported by a bottle carrier assembly 216, rotary movement of the turret 210 brings about a first period of motion in which the base 218 is rotated through operation of cam track 226 and cam roller 224 in which, as shown in FIGS. 16 and 17, the bottle assumes a traversing orientation with respect to the axis of rotation by the turret. The next increment of rotary movement of the turret brings about a second period of motion through operation of the cam slot 226 and cam roller 224 in which the base 218 is rotated together with the bottle to a position where the bottle is vertically orientated for support by a horizontal stationary plate 248 establishing a receiving station of a bottle steady assembly 250.

Figure 19:
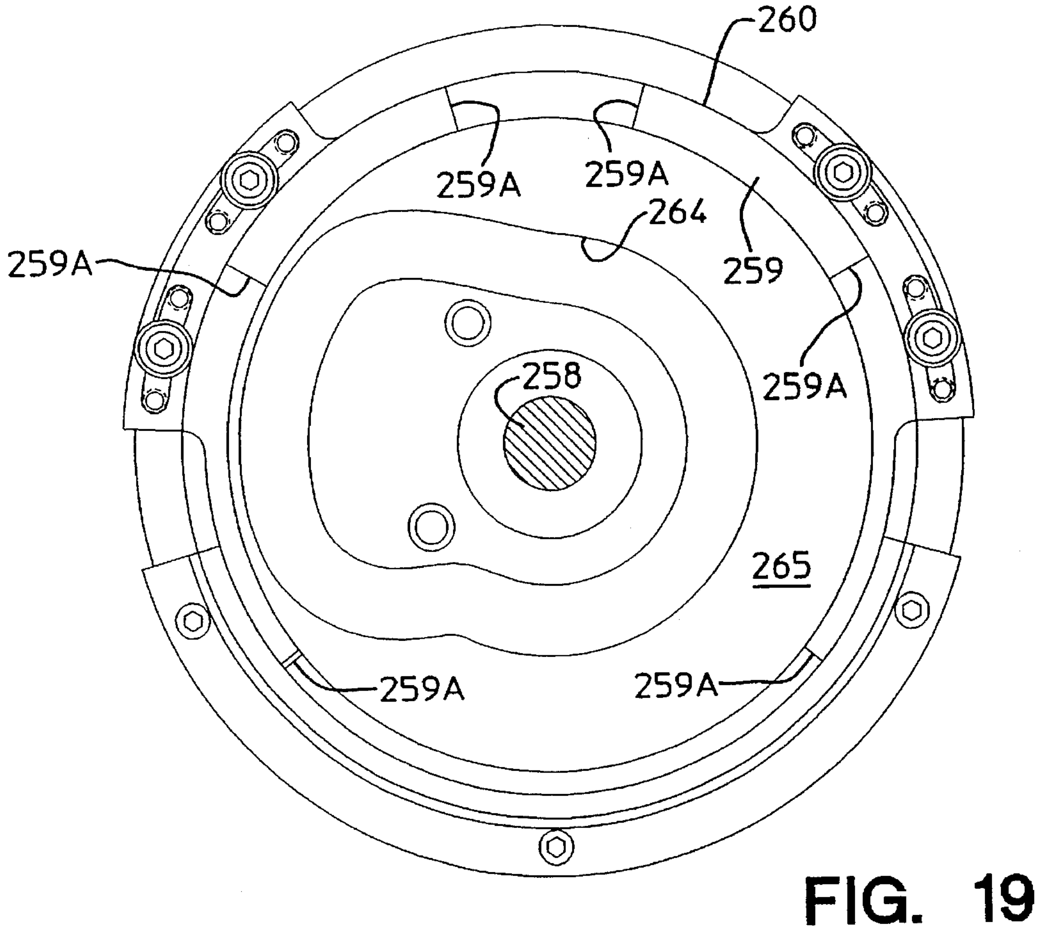
FIG. 19 is a sectional view taken along lines XIX—XIX of FIG. 14.

The bottle steady assembly takes the form of a carousel having four pairs of rods 252 and 254 extending vertically between upper and lower carousel carrier plates 256 which are supported by an arbor 258 to rotate about a vertical axis by an indexer drive 97B while supported at its upper end by a bearing assembly 258A that is in turn anchored for support by the frame of the decorating machine. The indexing drive 97B imparts an indexing rotary start and stop motion to the carrier plate which in turn indexes the associated pairs of rods 252 and 254 from the receiving station to a bottle delivery station at the entrance end of conveyor 206. A rod 254 of each of the four pairs of rods has on its lower end a follower roller 254A which rides along a cam surface 259 of a ring cam 260. As shown in FIG. 19, the cam surface 259 has motion transition sites 259A which establish the start and the stop to the raising and lowering of rods 254 by contact with their respective cam follower. The rods 254 are vertically displaced by the operation of the cam surface and the cam followers in response to rotary movement of the carousel carrier plates 256. Rods 254 are each provided with a mounting block 261 that in turn pivotally supports a lever 262 having at one end thereof a mouth cup 263 and the free end of the lever is connected to an associated one of the pair of rods 252 to oscillate in response to rotation of the rod 252. The rods 252 are each provided at their lower ends with cam followers that engage in a closed cam track 264 formed in a cam plate 265 that serves as a mounting structure for ring cam 260. The rotary indexing motion of the carousel plates 256 is accompanied by the capturing of the bottle mouth in a mouth cup 263 as the cup executes a swinging movement by operation of the closed cam track 264 with a simultaneous lowering of the mouth cup by operation of the cam track 259 to capture the mouth of the bottle. The closed cam track configuration in cam plate 265 insures reliable motion without erratic unwanted variations that might otherwise occur with unbounded cam followers. Beneath the mouth cup there is arranged a bottle push arm 266 extending from a mounting sleeve 268 secured to each of the rods 252. The cam surface 264 serves to pivot the mouth cup and pusher arm 266 with the carousel to transport a bottle from the horizontal stationary plate 248. As the bottle approaches the delivery conveyor, lifting cam 259 lifts push rod 254 thus separating the mouth cup from the neck of the bottle thereafter, the carousel enters a dwell period during which delivery conveyor 206 carries the bottle away from the carousel. The mouth cup and pusher arm are then swung by rotation of rod 252 under control by cam track 264 and retracted as the carousel enters an indexing period to prevent unwanted impact with the bottle. The bottle support plate serves to sustain the weight of the bottle while stabilized by the mouth cup during movement from the hand off site by the transfer device 208 to a delivery conveyor 206. The arrangement in the form of a carousel to move each of the four pairs of the rods 252 and 254 into a position for receiving a bottle after placed in a vertical orientation by the transfer device and handing off the bottle onto the delivery conveyor materially reduces the transport time for moving the bottles. In the past, bottles were carried by only one bottle mouth cup and push arm of known prior art bottle steady designs. The known body steady design was required to move the bottle mouth cup and push arm through a first path of travel carrying the bottle to the delivery conveyor and then returning the bottle mouth cup and push arm to a bottle receiving station. According to the present invention, to accommodate the higher through-put rate of the bottles in the bottle decorating machine, an improved bottle steady device is provided in the form of a carousel to eliminate the time required for returning bottle mouth cup and push arm to a bottle receiving position. Moreover, the utilization of four sets of bottle mouth cup and push arm serves to further reduce the time of possession of bottles by the carousel. An added advantage is that the four sets of bottle mouth cup and push arms move at a much slower rate than if only one bottle cup and transfer arm were used with a smoother and more stable transfer thus reducing the inertia forces imparted to the bottle.

Figure 20:
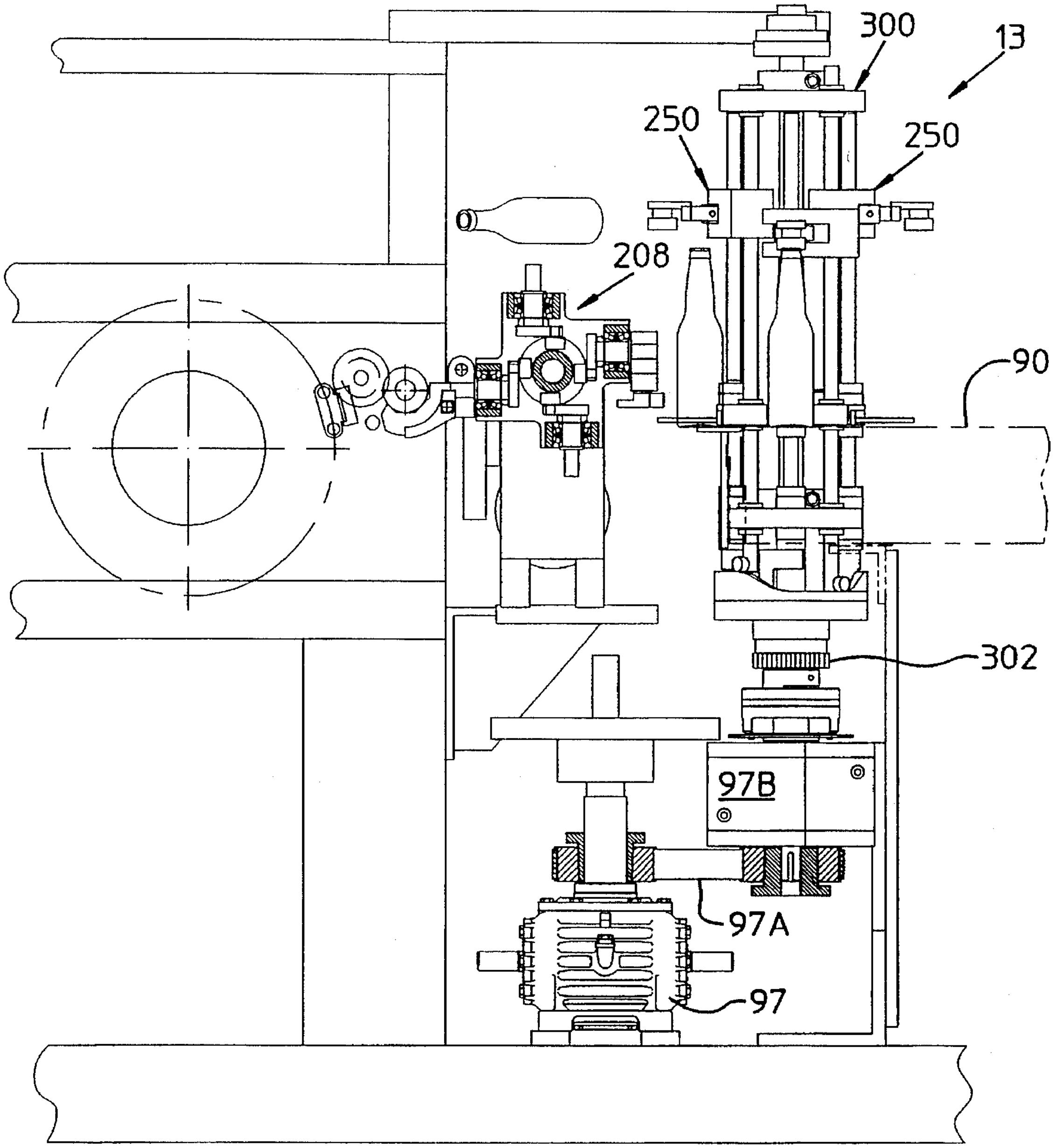
FIG. 20 is an elevational view partly in section showing the operator side of the bottle transfer and bottle steady devices at the entry end of the conveyor of the decorating machine.
Figure 21:
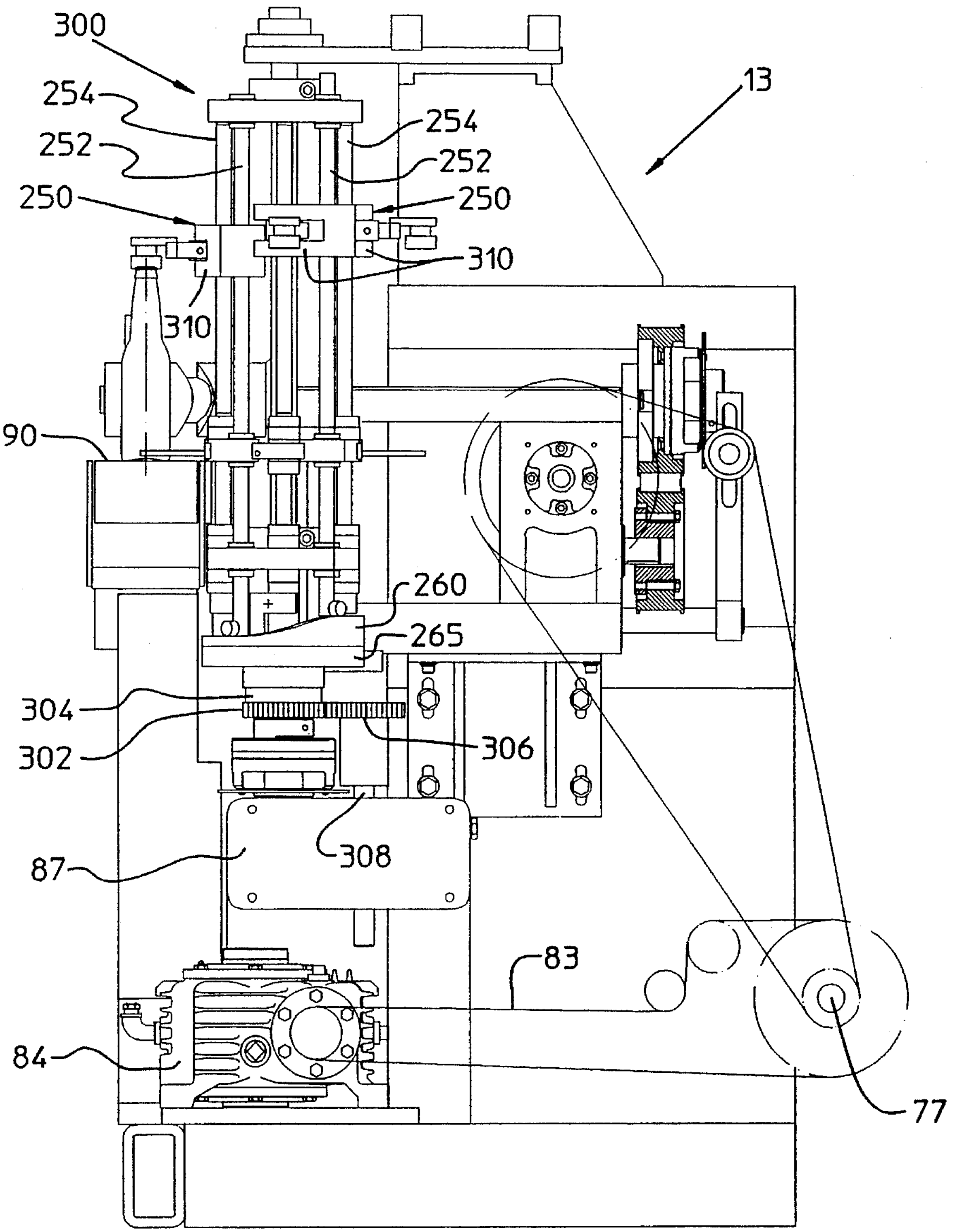
FIG. 21 is an elevational view partly in section showing the drive side, which is opposite the operator side of FIG. 20, of the bottle transfer and bottle steady devices at the entry end of the conveyor of the decorating machine.

A similar arrangement of apparatus to that serving to carryout the bottle handling functions of the bottle unloading equipment 15 is provided for the bottle loading equipment 13. As shown in FIGS. 20 and 21, the entry conveyor 90 supplies bottles at a predetermined spaced apart relation in response to the operation of bottle spacing screw 91 (FIG. 6) to a bottle steady 300 which embodies the same construction and relationship of parts which has been already described hereinbefore in regard to the bottle steady assembly 250 with the exception that the cam plate 265 and ring cam 260 are not stationary supported but instead rotatably supported and driven by a gear 302 mounted on the base of cam plate 265 having an overlying bearing support 304. Gear 302 meshes with a drive gear 306 that is mounted on an output shaft 308 on an auxiliary output shaft of indexer drive 87. The drive arrangement causing rotation of ring cam 260 and cam plate 265 serves to rapidly move the mouth cup into a bottle capturing relation and away from a bottle mouth at the release site for the transfer device to avoid possible collisions with parts forming the carousel and the transfer device 208. As shown in FIGS. 20 and 21 the mouth cup is supported by a link arm 310 engaged with each of the rods 252 and 254. The operation of cam 260 vertically displaces each rod 254 and its associated mouth cup into a bottle receiving and a bottle release position. The rods 252 slidably support the link arm during its vertical movement by rod 252. The description including identification by reference numerals of the components forming the carousel and the transfer device comprising the bottle loading equipment are the same as that of the carousel 250 and the transfer device 208 comprising the bottle unloading equipment described previously. The carousel arrangement forming four bottle carrying stations reduces the transport time and offers the same advantages as the carousel in the bottle delivery equipment.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

We claim:

1. A method for high speed decorating of workpieces advanced to and from a decorating station, said method including the steps of:

displacing a decorating screen along a path of travel between a squeegee and a first workpiece while the workpiece is positioned at a decorating station to rotate about an axis lying in a first plane containing the squeegee;

removing the first workpiece from the first plane before stopping said displacing of the decorating screen to thereby increase the rate for decorating workpieces at said decorating station; thereafter again displacing the decorating screen relative to said first plane along said path of travel to decorate a second workpiece; and positioning and rotating the second workpiece in said first plane after initiating displacement of the decorating screen along the path of travel between the squeegee and the second workpiece, said step of removing the first workpiece before stopping said displacing of the decorating screen and said step of positioning and rotating the second workpiece after said again displacing the decorating screen occurring simultaneously for a period of time to increase the rate at which workpieces are decorated per unit of time.

2. The method of claim 1 wherein said step of removing the first workpiece and said step of positioning and rotating the second workpiece are further defined to comprise parts of a workpiece indexing period, said parts overlapping occurring steps of said advancing the decorating screen.

3. The method of claim 1 including advancing said workpiece along said path of travel by a conveyor.

4. The method according to claim 1 including the further step of using said squeegee to establish a line of contact between the decorating screen and the second workpiece after initiating advancing movement of the decorating screen by said step of again displacing and not before commencement of said step of positioning and rotating the second workpiece.

5. The method of claim 1 wherein the path of travel of said step of displacing a decorating screen comprises moving the screen along a linear path of travel.

6. The method of claim 1 wherein the workpiece continues to rotate after removal from said first plane by said step of removing to establish a point of reference for a succeeding decorating cycle.

7. The method according to claim 1 including the further step of bringing the movement of the decorating screen along said path of travel to a halt after decorating said first workpiece and thereafter moving the decorating screen in reverse direction along said path of travel for decorating said second workpiece.

8. The method according to claim 1 wherein the rate at which workpieces are decorated is increased by removing the workpiece from the first plane at a preselected time before stopping of the decorating screen without increasing the speed of advancing movement of the decorating screen between the squeegee and the workpiece.

9. The method according to claim 1 including the further step of registering said first workpiece to establish a desired orientation for decoration at said decorating station, said registration comprising rotating the workpiece about a longitudinal axis of the workpiece before entry in a registration station, advancing said first workpiece to the registration station, using registration indicia on the workpiece to stop rotation of the workpiece at the registration station, and allowing the workpiece to remain non-rotatably orientated while indexing the orientated workpiece to said first plane.

10. The method according to claim 1 further including supplying workpieces to said decorating station to rotate about an axis which is horizontal and corresponding to a workpiece axis extending between a base and a mouth of the workpiece.

11. The method according to claim 10 wherein said step of supplying workpieces includes establishing a spaced apart relation between a workpiece axis of each of a plurality of workpieces wherein each workpiece has a workpiece axis extending vertically, advancing intermittently each of said plurality of said workpiece horizontally with the workpieces vertical to a hand off station, translating the position of the workpiece received at the hand off station to a horizontal orientation of said workpiece axis, and supplying workpieces with a horizontal workpiece axis to said first plane.

12. The method according to claim 11 wherein said step of advancing intermittently includes using a closed cam drive means to prevent unwanted release of the workpiece during 13. The method according to claim 11 wherein said step of translating includes using a closed cam drive means to prevent unwanted release of the workpiece during translating motion.

14. The method according to claim 1 further including the step of discharging workpieces from said decorating station with a rotational axis of the workpiece extending along a length of the workpiece between a base and a mouth.

15. The method according to claim 14 wherein said step of discharging workpieces includes advancing intermittently each of said plurality of said workpieces with its workpiece axis orientated horizontally at said decorating station to a hand off station, translating the position of the workpiece received at the hand off station to a vertical orientation of said workpiece axis, and transferring said workpieces with a vertical workpiece axis intermittently to a discharge conveyor.

16. The method according to claim 14 wherein said step of discharging includes using a closed cam drive means to prevent unwanted release of the workpiece during advancing motion.

17. The method according to claim 14 wherein said step of translating includes using a closed cam drive means to prevent unwanted release of the workpiece during translating motion from a horizontal orientation to a vertical orientation of said workpiece axis.

18. Apparatus for high speed decoration of workpieces, said apparatus including the combination of:

first drive means for intermittently advancing first and second spaced apart workpieces along a course of travel containing a decorating station wherein each workpiece remains stationary during decoration of a workpiece surface;

second drive means for rotating each of the first and second workpieces indexed in succession at said decorating station, said second drive means including control means for initiating rotation of a workpiece before a workpiece is indexed to a fixed position at the decorating station, said control means further continuing rotation of a workpiece after initiating advancing movement of a workpiece from the decorating station;

third drive means coupled to reciprocate a decorating screen relative to a workpiece at said fixed position at said decorating station as well as during said initiating rotation and said continuing rotation of a workpiece; and fourth drive means coupled to a squeegee for pressing said decorating screen into line contact with a workpiece for decoration thereof.

19. The apparatus according to claim 18 including a drive motor for simultaneously rotating each of said first drive means, second drive means, third drive means, and fourth drive means.

20. The apparatus according to claim 18 wherein said first drive means includes an indexing drive box with indexing rotation output forming a workpiece dwell period and a workpiece index period and wherein said second drive means includes a closed cam driving a follower for defining a workpiece rotation cycle and a workpiece rotation dwell cycle, said workpiece dwell period beginning after and terminating before said workpiece rotation cycle.

21. The apparatus according to claim 18 wherein said first drive means includes an indexing drive box with indexing rotation output forming a workpiece dwell period and a workpiece index period and wherein said third drive means includes a closed cam driving a follower for defining a screen cycle and a workpiece index period, said screen dwell cycle beginning before and extending beyond said screen dwell cycle.

22. The apparatus according to claim 18 including fifth drive means for registering a workpiece in a predetermined relation to a decorating station, said fifth drive means including control means for initiating rotation of a workpiece before a workpiece is indexed at a work position at a registration station.

23. Apparatus for supplying workpieces for a high speed intermittent motion decoration, said apparatus including the combination of:

means for advancing workpieces in a free standing vertical orientation at a spaced apart relation along a course of travel incident to decoration thereof;

stabilizing means captively engaged at vertically spaced apart sites with each workpiece for transferring said workpieces in succession from said means for advancing to a hand off station;

transfer means for workpieces at said hand off station of said stabilizing means for intermittently translating the orientation of the workpieces between a first and a second orientation, one orientation being vertical and one orientation being horizontal; and decorating means for intermittently decorating workpieces at said horizontal orientation.

24. The apparatus according to claim 23 wherein said stabilizing means includes a closed cam for driving a follower to stabilize workpieces while intermittently advanced.

25. The apparatus according to claim 23 wherein said transfer means includes a closed cam for driving a follower to transfer workpieces intermittently from said first and second orientations.

* * * * *